(12) United States Patent
Williamson et al.

(10) Patent No.: US 8,674,019 B2
(45) Date of Patent: Mar. 18, 2014

(54) COMPOSITE PRODUCTS MADE WITH LEWIS ACID CATALYZED BINDER COMPOSITIONS THAT INCLUDE TANNINS AND MULTIFUNCTIONAL ALDEHYDES

(71) Applicant: Georgia-Pacific Chemicals LLC, Atlanta, GA (US)

(72) Inventors: Bobby L. Williamson, Conyers, GA (US); Feng Jing, Snellville, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 0 days.

(21) Appl. No.: 13/869,070

(22) Filed: Apr. 24, 2013

(65) Prior Publication Data

US 2013/0289191 A1    Oct. 31, 2013

Related U.S. Application Data

(60) Provisional application No. 61/639,281, filed on Apr. 27, 2012.

(51) Int. Cl.
*B27N 3/00*    (2006.01)
*C08L 61/06*   (2006.01)

(52) U.S. Cl.
USPC ............ 524/594; 264/109; 528/156; 528/157

(58) Field of Classification Search
None
See application file for complete search history.

(56) References Cited

U.S. PATENT DOCUMENTS

| | | |
|---|---|---|
| 2,492,510 A | 12/1949 | Van Epps |
| 2,507,465 A | 5/1950 | Ayers |
| 2,781,286 A | 2/1957 | Ayers et al. |
| 3,285,805 A | 11/1966 | Bryner |
| 3,311,594 A | 3/1967 | Earle, Jr. |
| 3,442,754 A | 5/1969 | Espy |
| 3,700,623 A | 10/1972 | Keim |
| 3,772,076 A | 11/1973 | Keim |
| 3,957,703 A | 5/1976 | Ludwig et al. |
| 4,070,314 A | 1/1978 | Alexander |
| 4,244,846 A | 1/1981 | Edler |
| 4,536,524 A | 8/1985 | Hart et al. |
| 4,625,029 A | 11/1986 | Floyd et al. |
| 4,656,296 A | 4/1987 | Floyd |
| 4,695,606 A | 9/1987 | Floyd et al. |
| 4,778,530 A | 10/1988 | Ayers |
| 4,889,877 A | 12/1989 | Seitz |
| 4,936,916 A | 6/1990 | Shimnitsu |
| 5,362,842 A | 11/1994 | Graves et al. |
| 5,389,716 A | 2/1995 | Graves |
| 5,435,376 A | 7/1995 | Hart et al. |
| 5,532,293 A | 7/1996 | Landis |
| 5,532,330 A | 7/1996 | Pizzi et al. |
| 5,709,340 A | 1/1998 | Chao |
| 5,741,592 A | 4/1998 | Lewis et al. |
| 5,911,923 A | 6/1999 | Work et al. |
| 5,919,407 A | 7/1999 | Chao |
| 5,919,557 A | 7/1999 | Lorenz et al. |
| 6,004,417 A | 12/1999 | Roesch et al. |
| 6,043,350 A | 3/2000 | Roll et al. |
| 6,084,010 A | 7/2000 | Baetzold et al. |
| 6,497,760 B2 | 12/2002 | Sun et al. |
| 6,592,990 B2 | 7/2003 | Swantes |
| 6,642,299 B2 | 11/2003 | Wertz et al. |
| 6,703,127 B2 | 3/2004 | Davis et al. |
| 6,835,334 B2 | 12/2004 | Davis et al. |
| 7,026,390 B2 | 4/2006 | O'brien-Bernini et al. |
| 7,286,279 B2 | 10/2007 | Yu et al. |
| 7,294,678 B2 | 11/2007 | McGlothlin et al. |
| 7,297,404 B2 | 11/2007 | Bayless |
| 7,300,530 B2 | 11/2007 | Bouchette et al. |
| 7,309,500 B2 | 12/2007 | Kim et al. |
| 7,319,131 B2 | 1/2008 | Swedo et al. |
| 7,323,039 B2 | 1/2008 | Suzuki et al. |
| 7,344,705 B2 | 3/2008 | Unger |
| 7,368,130 B2 | 5/2008 | Kim et al. |
| 7,368,613 B2 | 5/2008 | Eh |
| 7,374,782 B2 | 5/2008 | Brown |

(Continued)

FOREIGN PATENT DOCUMENTS

| | | |
|---|---|---|
| EP | 924280 B1 | 8/2004 |
| WO | 98/37147 A2 | 8/1998 |
| WO | 2004/058843 A1 | 7/2004 |
| WO | 2010/019666 A1 | 2/2010 |
| WO | 2011/042610 A1 | 4/2011 |

OTHER PUBLICATIONS

Ballerini, Aldo, et al. "Non-Toxic, Zero Emission Tannin-Glyoxal Adhesives for Wood Panels", Holz als Roh- und Werkstoff, 2005, pp. 477-478, vol. 63, ENSTIB, University of Nancy 1, Epinall, France.
Meikleham, N., et al. "Induced Accelerated Autocondensation of Polyflavonoid Tannins for Phenolic Polycondensates. 1. 13C-NMR, 89Si-NMR, X-Ray, and Polarimetry Studies and Mechanism", Journal of Applied Polymer Science, 1994, pp. 1827-1845, vol. 45, John Wiley & Sons, Inc.
Pizzi, A. "Recent Developments in eco-Efficient Bio-Based Adhesives for Wood Bonding: Opportunities and Issues", Journal of Adhesion Sci. Technol., 2006, pp. 829-846, vol. 20, No. 8, VSP Publishing.
International Search Report and the Written Opinion of the International Searching Authority for PCT/US2013/037886 mailed Aug. 23, 2013.

*Primary Examiner* — Mary F Theisen
(74) *Attorney, Agent, or Firm* — Ram W. Sabnis

(57) ABSTRACT

Composite products made with binder compositions that include one or more tannins, one or more multifunctional aldehydes, and one or more Lewis acids and methods for making same. The method can include contacting a plurality of substrates with the binder composition and at least partially curing the binder composition to produce a composite product. The one or more multifunctional aldehyde compounds can include (1) two or more carbon atoms and two or more aldehyde functional groups, or (2) two or more carbon atoms, at least one aldehyde functional group, and at least one functional group other than an aldehyde functional group. A carbon atom of at least one aldehyde functional group can have a first bond with a first tannin molecule and a second bond with (a) the first tannin molecule, (b) a second tannin molecule, or (c) an oxygen atom of the at least one aldehyde functional group.

20 Claims, No Drawings

(56) References Cited

U.S. PATENT DOCUMENTS

| | | |
|---|---|---|
| 7,375,070 B2 | 5/2008 | Pegelow et al. |
| 7,376,344 B2 | 5/2008 | Manne |
| 7,550,200 B2 | 6/2009 | Hart et al. |
| 7,736,559 B2 | 6/2010 | Rivers et al. |
| 7,781,501 B2 | 8/2010 | Dopico et al. |
| 7,807,749 B2 | 10/2010 | Pisanova et al. |
| 2003/0203998 A1 | 10/2003 | Gres |
| 2005/0054787 A1 | 3/2005 | Swedo et al. |
| 2006/0142433 A1 | 6/2006 | Rivers et al. |
| 2007/0027283 A1 | 2/2007 | Swift et al. |
| 2007/0054144 A1 | 3/2007 | Dopico et al. |
| 2007/0123679 A1 | 5/2007 | Swift et al. |
| 2007/0123680 A1 | 5/2007 | Swift et al. |
| 2007/0142596 A1 | 6/2007 | Swift et al. |
| 2008/0027159 A1 | 1/2008 | Rivers et al. |
| 2011/0021669 A1 | 1/2011 | van Herwijnen et al. |
| 2011/0060095 A1 | 3/2011 | Tutin et al. |
| 2011/0165398 A1 | 7/2011 | Shoemake et al. |
| 2012/0064323 A1 | 3/2012 | Shoemake et al. |

COMPOSITE PRODUCTS MADE WITH LEWIS ACID CATALYZED BINDER COMPOSITIONS THAT INCLUDE TANNINS AND MULTIFUNCTIONAL ALDEHYDES

CROSS-REFERENCE TO RELATED APPLICATION

This application claims priority to U.S. Provisional Patent Application having Ser. No. 61/639,281, filed on Apr. 27, 2012, which is incorporated by reference herein.

BACKGROUND

1. Field

Embodiments described herein generally relate to composite products made with binder compositions catalyzed by one or more Lewis acids, where the binder composition includes one or more tannins and one or more multifunctional aldehydes and methods for making and using same.

2. Description of the Related Art

The production of composite wood products and composite fiber products require a binder to bond the discrete wood particulates or fibers to one another. Such conventional binders contain formaldehyde, which can be harmful to humans and the environment. Such formaldehyde based binders include urea-formaldehyde ("UF"), melamine-formaldehyde ("MF"), phenol-formaldehyde ("PF"), melamine-urea-formaldehyde ("MUF"), and phenol-urea-formaldehyde resins ("PUF"). While these formaldehyde based binders produce composite wood products and composite fiber products having desirable properties, formaldehyde is released during the production of the binder, during cure of the composite product containing the binder, as well as, from the final composite products made using the binder.

Various alternative binders have been studied in an attempt to reduce the amount of formaldehyde based binder or completely replace the formaldehyde based binder altogether in the production of composite products. One type of binder that has been studied includes the use of tannins. The tannins can be combined with formaldehyde based binders to reduce the overall concentration of formaldehyde in the binder, used alone, or mixed with a hardener or curing agent such as hexamethylene tetramine, paraformaldehyde, silica, boric acid, or the like. These attempts to reduce formaldehyde emission, however, are accompanied with one or more undesirable effects such as binders that continue to emit more formaldehyde than desired, longer cure times, reduced shelf-life of the resin, reduced product strength, reduced tolerance for processing variations, and/or inferior moisture resistance.

There is a need, therefore, for improved binder compositions for making composite products having reduced or no formaldehyde emission.

SUMMARY

Composite products made with binder compositions catalyzed by one or more Lewis acids, where the binder composition includes one or more tannins and one or more multifunctional aldehydes, and methods for making same are provided. In at least one specific embodiment, the method for making a composite product can include contacting a plurality of substrates with a binder composition. The binder composition can include one or more tannins, one or more Lewis acids, and one or more multifunctional aldehyde compounds. The one or more multifunctional aldehyde compounds can include: (1) two or more carbon atoms and two or more aldehyde functional groups, or (2) two or more carbon atoms, at least one aldehyde functional group, and at least one functional group other than an aldehyde functional group. The method can also include at least partially curing the binder composition to provide a composite product. A carbon atom of at least one aldehyde functional group in the cured binder composition can have a first bond with a first tannin molecule of the one or more tannins and a second bond with (a) the first tannin molecule, (b) a second tannin molecule of the one or more tannins, or (c) an oxygen atom of the at least one aldehyde functional group.

In at least one other specific embodiment, the method for making the composite product can include contacting a plurality of lignocellulose substrates with a binder composition. The binder composition can include one or more tannins, one or more Lewis acids, one or more base compounds, and one or more multifunctional aldehyde compounds. The one or more tannins can be derived from a black wattle tree, a quebracho tree, or a combination thereof. The one or more Lewis acids can be boric acid, sodium tetraborate, aluminum hydroxide, silicon dioxide, sodium silicate, or any combination thereof. The one or more base compound can be potassium hydroxide, sodium hydroxide, potassium carbonate, sodium carbonate, or any combination thereof. The one or more multifunctional aldehyde compounds can include (1) two or more carbon atoms and two or more aldehyde functional groups, or (2) two or more carbon atoms, at least one aldehyde functional group, and at least one functional group other than an aldehyde functional group. The method can also include at least partially curing the binder composition to provide a composite product. A carbon atom of at least one aldehyde functional group in the cured binder composition can have a first bond with a first tannin molecule of the one or more tannins and a second bond with (a) the first tannin molecule, (b) a second tannin molecule of the one or more tannins, or (c) an oxygen atom of the at least one aldehyde functional group.

In at least one specific embodiment, the composite product can include a plurality of substrates and an at least partially cured binder composition. The binder composition, prior to curing, can include one or more tannins, one or more Lewis acids, and one or more multifunctional aldehyde compounds. The one or more multifunctional aldehyde compounds can include (1) two or more carbon atoms and two or more aldehyde functional groups, or (2) two or more carbon atoms, at least one aldehyde functional group, and at least one functional group other than an aldehyde functional group. A carbon atom of at least one aldehyde functional group in the cured binder composition can have a first bond with a first tannin molecule of the one or more tannins and a second bond with (a) the first tannin molecule, (b) a second tannin molecule of the one or more tannins, or (c) an oxygen atom of the at least one aldehyde functional group.

DETAILED DESCRIPTION

It has been surprisingly and unexpectedly discovered that binder compositions containing one or more tannins, one or more multifunctional aldehyde compounds, one or more Lewis acids, and optionally one or more base compounds can be used to produce lignocellulose based and/or fiber based composite products having acceptable properties without the need for formaldehyde based binders or without the need for as much aldehyde based binders as previously required. In other words, the binder composition containing the one or more tannins, the one or more multifunctional aldehydes, and the one or more Lewis acids can be used alone to produce composite products or can be combined with one or more aldehyde based binders to provide a binder system containing less aldehyde compounds as compared to previous aldehyde based binders.

As used herein, the term "tannin" refers to both hydrolyzable tannins and condensed tannins. As such, the binder composition can include hydrolyzable tannins, condensed tannins, or a combination of hydrolyzable tannins and condensed tannins. Illustrative genera of shrubs and/or trees from which suitable tannins can be derived can include, but are not limited to, *Acacia, Castanea, Vachellia, Senegalia, Terminalia, Phyllanthus, Caesalpinia, Quercus, Schinopsis, Tsuga, Rhus, Juglans, Carya*, and *Pinus*, or any combination or mixture thereof. In another example, genera from which suitable tannins can be derived can include, but are not limited to, *Schinopsis, Acacia*, or a combination thereof. In another example, genera from which suitable tannins can be derived can include, but are not limited to, *Pinus, Carya*, or a combination thereof.

Hydrolyzable tannins are mixtures of simple phenols such as pyrogallol and ellagic acid and of esters of a sugar, e.g., glucose, with gallic and digallic acids. Illustrative hydrolyzable tannins can include, but are not limited to, extracts recovered from *Castanea sativa*, (e.g., chestnut), *Terminalia* and *Phyllanthus* (e.g., myrabalans tree species), *Caesalpinia coriaria* (e.g., divi-divi), *Caesalpinia spinosa*, (e.g., tara), algarobilla, valonea, and *Quercus* (e.g., oak). Condensed tannins are polymers formed by the condensation of flavans. Condensed tannins can be linear or branched molecules. Illustrative condensed tannins can include, but are not limited to *Acacia mearnsii* (e.g., wattle or mimosa bark extract), *Schinopsis* (e.g., quebracho wood extract), *Tsuga* (e.g., hemlock bark extract), *Rhus* (e.g., sumach extract), *Juglans* (e.g., walnut), *Carya illinoinensis* (e.g., pecan), and *Pinus* (e.g., *Radiata* pine, Maritime pine, bark extract species).

The condensed tannins include about 70 wt % to about 80 wt % active phenolic ingredients (the "tannin fraction") and the remaining ingredients (the "non-tannin fraction") can include, but are not limited to, carbohydrates, hydrocolloid gums, and amino and/or imino acid fractions. The condensed tannins can be used as recovered or extracted from the organic matter or the condensed tannins can be purified, e.g., to about 95 wt % or more active phenolic ingredients. Hydrolyzable tannins and condensed tannins can be extracted from the starting material, e.g., trees and/or shrubs, using well established processes. A more detailed discussion of tannins is discussed and described in the *Handbook of Adhesive Technology*, Second Edition, CRC Press, 2003, chapter 27, "Natural Phenolic Adhesives I: Tannin," and in *Monomers, Polymers and Composites from Renewable Resources*, Elsevier, 2008, chapter 8, "Tannins: Major Sources, Properties and Applications."

The condensed tannins can be classified or grouped into one of two main categories, namely, those containing a resorcinol unit and those containing a phloroglucinol unit. Illustrative tannins that include the resorcinol unit include, but are not limited to, black wattle tannins and quebracho tannins. The resorcinol unit can be represented by formula I below.

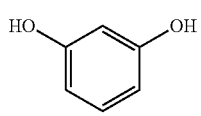

Formula I

The resorcinol group is shown within the box overlaying the unit structure of black wattle and quebracho tannins in Formula II below. For simplicity, the structure of black wattle and quebracho tannins is represented by their flavonoid unit structure.

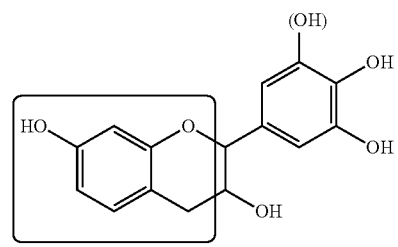

Formula II

Illustrative tannins that include the phloroglucinol unit include, but are not limited to, pecan tannins and pine tannins. The phloroglucinol unit can be represented by Formula III below.

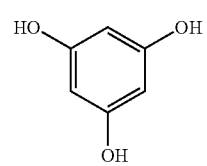

Formula III

The phloroglucinol unit is shown within the box overlaying the unit structure of pecan and pine tannins in Formula IV below. For simplicity, the structure of pecan and pine tannins is represented by their flavonoid unit structure.

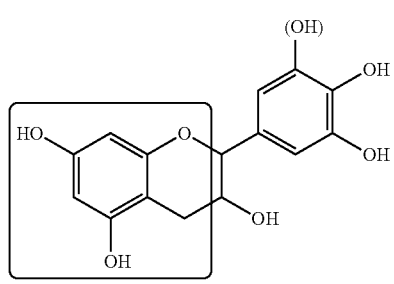

Formula IV

Phloroglucinol is known for higher reactivity than resorcinol. As such, tannins that include the phloroglucinol unit are more reactive than tannins that include the resorcinol unit.

If the binder composition includes a mixture of hydrolyzable tannins and condensed tannins any ratio with respect to one another can be used. For example, a binder composition that includes both hydrolyzable tannins and condensed tannins can have a concentration of condensed tannins ranging from about 1 wt % to about 99 wt %, based on the combined weight of the hydrolyzable tannins and the condensed tannins. In another example, a binder composition that includes both hydrolyzable tannins and condensed tannins can have a concentration of condensed tannins of about 50 wt % or more, about 55 wt % or more, about 60 wt % or more, about 70 wt % or more, about 75 wt % or more, about 80 wt % or more, about 85 wt % or more, about 90 wt % or more, about 95 wt % or more, or about 97 wt % or more.

If the binder composition includes two or more different tannins, the two or more tannins can have resorcinol unit or a phloroglucinol unit. For example, the binder composition can include two different tannins that each includes resorcinol units, e.g., qubracho tannins and black wattle tannins. In another example, the binder composition can include two different tannins, where a first tannin includes a resorcinol unit, e.g., black wattle tannin, and a second tannin includes a phloroglucinol unit, e.g., pine tannin. In another example, the binder composition can include two different tannins that each includes phloroglucinol units, e.g., pine tannins and pecan tannins.

If the binder composition includes a mixture of two different tannins, the two tannins can be present in any ratio with respect to one another. For example, a binder composition that includes a first tannin and a second tannin, where the first and second tannins are different from one another, can have a concentration of the first tannin ranging from about 1 wt % to about 99 wt % and conversely about 99 wt % to about 1 wt % of the second tannin, based on the combined weight of the first and second tannins. In another example, the amount of the first tannin in a binder composition that includes a first and second tanning can range from a low of about 5 wt %, about 10 wt %, about 15 wt %, about 20 wt %, about 25 wt % about 30 wt %, about 35 wt %, about 40 wt %, or about 45 wt % to a high of about 60 wt %, about 65 wt %, about 70 wt %, about 75 wt %, about 80 wt %, about 85 wt %, about 90 wt %, or about 95 wt %, based on the combined weight of the first and second tannins. The binder composition can include any number of different tannins with the different tannins present in any desired amount.

The tannins can have an acidic pH. For example, the pH of the tannins can range from a low of about 3, about 3.5, or about 4 to a high of about 5, about 5.5, or about 6. The tannins can have resorcinol or phloroglucinol functional groups that can react with aldehydes under appropriate conditions. Suitable, commercially available tannins can include, but are not limited to, black wattle tannin and quebracho tannin. Other suitable tannins can include pine tannin and pecan tannin.

As used herein, the terms "multifunctional aldehyde compound" and "multifunctional aldehyde" are used interchangeably and refer to compounds having at least two functional groups, with at least one of the functional groups being an aldehyde group. For example, the multifunctional aldehyde can include two or more aldehyde functional groups. In another example, the multifunctional aldehyde can include at least one aldehyde functional group and at least one functional group other than an aldehyde functional group. As used herein, the term "functional group" refers to reactive groups in the multifunctional aldehyde compound and can include, but is not limited to, aldehyde groups, carboxylic acid groups, ester groups, amide groups, imine groups, epoxide groups, aziridine groups, azetidinium groups, and hydroxyl groups.

The multifunctional aldehyde compound can include two or more carbon atoms and have two or more aldehyde functional groups. For example, the multifunctional aldehyde compound can include two, three, four, five, six, or more carbon atoms and have two or more aldehyde functional groups. The multifunctional aldehyde compound can include two or more carbon atoms and have at least one aldehyde functional group and at least one functional group other than an aldehyde group such as a carboxylic acid group, an ester group, an amide group, an imine groups, an epoxide group, an aziridine group, an azetidinium group, and/or a hydroxyl group. For example, the multifunctional aldehyde compound can include two, three, four, five, six, or more carbon atoms and have at least one aldehyde functional group and at least one functional group other than an aldehyde group such as a carboxylic acid group, an ester group, an amide group, an imine groups, an epoxide group, an aziridine group, an azetidinium group, and/or a hydroxyl group.

Suitable bifunctional or difunctional aldehydes that include three (3) or more carbon atoms and have two aldehyde functional groups (—CHO) can be represented by the following formula:

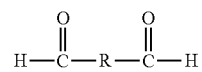

where R is a divalent aliphatic, cycloaliphatic, aromatic, or heterocyclic group having from 1 to 12 carbon atoms. Illustrative multi-functional aldehydes can include, but are not limited to, malonaldehyde, succinaldehyde, glutaraldehyde, 2-hydroxyglutaraldehyde, β-methylglutaraldehyde, adipaldehyde, pimelaldehyde, suberaldehyde, malealdehyde, fumaraldehyde, sebacaldehyde, phthalaldehyde, isophthalaldehyde, terephthalaldehyde, ring-substituted aromatic aldehydes, or any combination or mixture thereof. A suitable bifunctional or difunctional aldehyde that includes two carbon atoms and has two aldehyde functional groups is glyoxal.

Illustrative multifunctional aldehyde compounds that include an aldehyde group and a functional group other than an aldehyde group can include, but are not limited to, glyoxylic acid, glyoxylic acid esters, glyoxylic acid amides, 5-(hydroxymethyl)furfural, or any combination or mixture thereof. The aldehyde group in the multifunctional aldehyde compound can exist in other forms, e.g., as a hydrate. As such, any form or derivative of a particular multifunctional aldehyde compound can be used to prepare the binder compositions. For example, in the context of glyoxylic acid, glyoxylic acid, glyoxylic acid monohydrate, and/or glyoxylate can be combined with the tannins and the Lewis acid to produce the binder composition.

The carbon atom in at least one aldehyde functional group of the multifunctional aldehyde compound can bond with the tannin upon at least partial curing of the binder composition. As used herein, the terms "curing," "cured," and similar terms are intended to refer to the structural and/or morphological change that occurs in the binder composition as it is cured to cause covalent chemical reaction (crosslinking), ionic interaction or clustering, improved adhesion to the substrate, phase transformation or inversion, and/or hydrogen bonding. As used herein, the phrases "at least partially cure," "at least partially cured," and similar terms are intended to refer to a binder composition that has undergone at least some covalent chemical reaction (crosslinking), ionic interaction or clustering, improved adhesion to the substrate, phase transformation or inversion, and/or hydrogen bonding, but may also be capable of undergoing additional covalent chemical reaction (crosslinking), ionic interaction or clustering, improved adhesion to the substrate, phase transformation or inversion, and/or hydrogen bonding.

The carbon atom in at least one aldehyde functional group of the multifunctional aldehyde compound in the cured binder composition can have a first bond with a first tannin molecule in the one or more tannins. The carbon atom in the at least one aldehyde functional group of the multifunctional aldehyde compound in the cured binder composition can also have a second bond with (1) the first tannin molecule, (2) a second tannin molecule in the one or more tannins, or (3) an oxygen atom of the at least one aldehyde functional group. For example, the carbon atom in at least one aldehyde functional group of the multifunctional aldehyde compound can form a first and a second bond with a first tannin molecule in the one or more tannins when the binder composition is at least partially cured. In another example, the carbon atom in at least one aldehyde functional group of the multifunctional aldehyde compound can for a first bond with a first tannin molecule in the one or more tannins and a second bond with a second tannin molecule in the one or more tannins when the binder composition is at least partially cured. In another example, the carbon atom in at least one aldehyde functional group of the multifunctional aldehyde compound can for a first bond with a first tannin molecule in the one or more tannins and a can have or maintain a second bond to the oxygen atom of the at least one aldehyde functional group. Said another way, in the cured binder composition, the carbon atom of at least one aldehyde functional group of the multifunctional aldehyde compound can have a first bond with a first tannin molecule in the one or more tannins and a second bond with the first tannin molecule, a second tannin molecule in the one or more tannins, or the oxygen atom of the at least one aldehyde functional group.

Some illustrative reaction products (A, B, C, D) of glutaraldehyde and a tannin containing a resorcinol unit, e.g., black wattle tannin or quebracho tannin, are shown below in Scheme I. For simplicity, the tannin is represented by its flavonoid unit structure. R, as shown in the product labeled D can be one or more flavonoid units or other functional groups that can connect two flavonoid units of a tannin together.

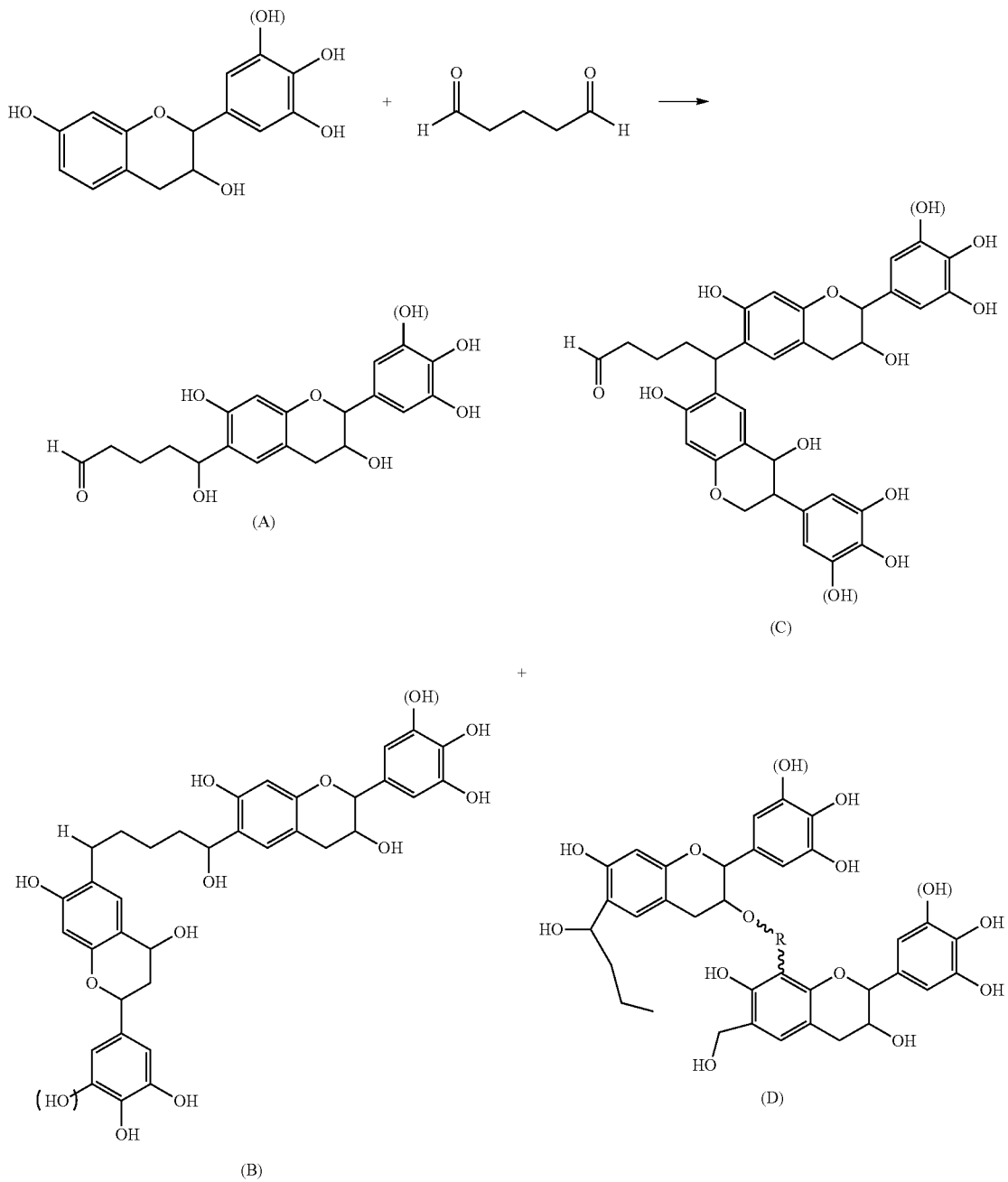

Some illustrative reaction products (A, B, C, D) of glutaraldehyde and a tannin containing a phloroglucinol unit, e.g., pecan tannin or pine tannin, are shown below in Scheme II. For simplicity, the tannin is represented by its flavonoid unit structure. R, as shown in the product labeled D can be one or more flavonoid units or other functional groups that can connect two flavonoid units of a tannin together.

group can form a first bond with a first tannin and a second bond with a second tannin. For the D products shown in Scheme I and II, the carbon atom of at least one aldehyde group can form a first bond with a first tannin and a second bond with the first tannin. Without wishing to be bound by theory, it is believed that the probability of the carbon atom of the at least one aldehyde functional group of the multifunc-

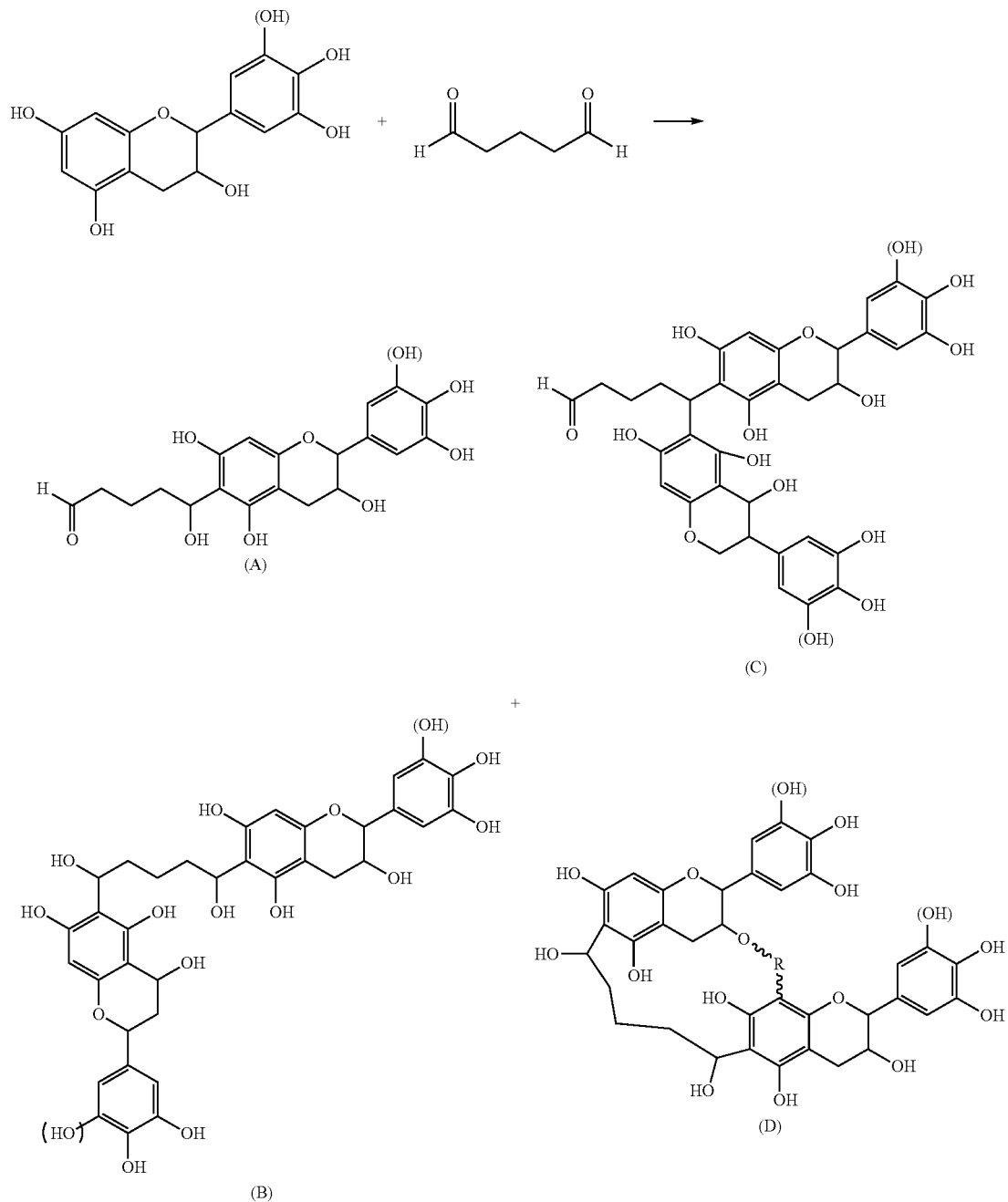

Scheme II

As shown in both Scheme I and II, for products A and B the carbon atom of at least one aldehyde group can form a first bond with a first tannin and a second bond with the oxygen atom of the aldehyde group. Also shown in both Scheme I and II, for products C, the carbon atom of at least one aldehyde tional aldehyde to form a first bond and second bond with the same tannin molecule increases as the number of flavonoid units increase. Tannins can include multiple flavonoid units, e.g., from 2 to 11, and the greater the number of flavonoid units the greater the likelihood is that the carbon atom of an aldehyde group can form a first and second bond with the same tannin.

The Lewis acid is a molecule or ion (also called an electrophile) that can combine with another molecule or ion by forming a complex with two electrons from the second molecule or ion. In other words, the Lewis acid is a compound that accepts an electron pair. The Lewis acid can accelerate the crosslinking reactions between the tannin and the multifunctional aldehyde compound. Said another way, the Lewis acid can catalyze the crosslinking reactions between the tannins and the multifunctional compounds.

Suitable Lewis acids can include compounds that contain elements with an atomic mass of 32 or less. Suitable Lewis acids can also include compounds that contain boron, aluminum, or silicon. Illustrative Lewis acids can include, but are not limited to, boric acid, sodium tetraborate, aluminum hydroxide, silicon dioxide, sodium silicate, or any combination or mixture thereof. The Lewis acid can be in any form. For example, the Lewis acid can be in a non-hydrated form or a hydrated form.

The base compound can be or include any compound or combination of compounds capable of increasing the pH of the binder composition that includes the tannin, the multifunctional aldehyde compound, and the Lewis acid. Suitable bases or alkaline compounds can include, but are not limited to, hydroxides, carbonates, oxides, tertiary amines, amides, or any combination or mixture thereof. Illustrative hydroxides can include, but are not limited to, sodium hydroxide, potassium hydroxide, lithium hydroxide, cesium hydroxide, barium hydroxide, calcium hydroxide, magnesium hydroxide, aluminum hydroxide, or any combination or mixture thereof. Illustrative carbonates can include, but are not limited to, sodium carbonate, sodium bicarbonate, potassium carbonate, ammonium carbonate, or any combination or mixture thereof. Illustrative amines can include, but are not limited to, trimethylamine, triethylamine, triethanolamine, diisopropylethylamine (Hunig's base), pyridine, 4-dimethylaminopyridine (DMAP), 1,4-diazabicyclo[2.2.2]octane (DABCO), or any combination or mixture thereof.

In at least one specific embodiment, the base compound can be free from any amino containing compounds such as ammonia, amines, or amides. As such, in at least one example, the binder composition can be free or essentially free of any amino compounds. As used herein, the term "essentially free of any amino compounds" means the binder composition does not include or contain any intentionally added ammonia, amines, or amides. Said another way, the term "essentially free of amino compounds" means the binder composition does not contain amino compounds, but may include amino compounds present as an impurity. Additionally, since the carbon atom of the at least one aldehyde functional group of the multifunctional aldehyde compound can be bonded to one or more tannins or a tannin and an oxygen atom, the carbon atom of the at least one aldehyde functional group of the multifunctional aldehyde compound in the binder composition can be free from any bond to a nitrogen atom. In other words, the binder composition can be free from nitrogen atoms bonded to the carbon atom of the at least one aldehyde functional group of the multifunctional compound.

The binder composition can include a sufficient amount of the base compound to provide a binder composition with a pH ranging from about 4 to about 14. Alternatively, the binder composition that includes the tannin, multifunctional aldehyde compound, and Lewis acid can have a pH of about 4 to about 14. As such, the binder composition may or may not include the base compound. The pH of the binder composition can range from a low of about 4, about 5, or about 6 to a high of about 9, about 10, about 11, about 12, about 13, or about 14. The base compound can be an aqueous solution. For example, the base compound can be a 50 wt % aqueous sodium hydroxide solution. The particular pH of the binder composition can be based, at least in part, on the particular tannin(s), multifunctional aldehyde compound(s), and Lewis acid(s) present in a given binder composition. For example, the crosslinking reactions of a binder composition that includes a tannin derived from a pine tree can more readily proceed under acidic conditions as compared to a binder composition that includes a tannin derived from a black wattle tree, with all other variables remaining the same. As such, the pH of the binder composition can be used, at least in part, to adjust, control, alter, or otherwise affect the amount of time required for the binder composition to at least partially cure.

The one or more tannins, the one or more multifunctional aldehyde compounds, and the one or more Lewis acids can be mixed, blended, or otherwise combined with one another in any order or sequence to produce the binder composition. The one or more tannins, the one or more multifunctional aldehyde compounds, the one or more Lewis acids, and the one or more base compounds can be mixed, blended, or otherwise combined with one another in any order or sequence to produce the binder composition. For example, the tannin can be combined with the base compound to provide a first mixture, the Lewis acid can be combined with the first mixture to form a second mixture, and the multifunctional aldehyde compound can be combined with the second mixture to form the binder composition. In another example, the tannin can be combined with the Lewis acid to form the first mixture, the base compound can be combined with the first mixture to form the second mixture, and the multifunctional aldehyde compound can be combined with the second mixture to form the binder composition. In another example, the tannin can be combined with the Lewis acid to form the first mixture and the multifunctional compound can be combined with the first mixture to form the binder composition. In another example, the tannin, the multifunctional aldehyde compound, and the Lewis acid can be combined simultaneously with one another to form the binder composition. The base compound can optionally be combined with the tannin, the multifunctional aldehyde compound, and/or the Lewis acid.

As discussed in more detail below, the binder composition can be applied to a plurality of substrates or particulates, e.g., wood chips, glass fibers, and/or veneer, and at least partially cured to produce a product. The crosslinking reactions between the tannin and the multifunctional aldehyde compound in the binder composition can occur at room temperature and pressure or at elevated temperature and/or pressure. Applying heat and/or pressure can accelerate the crosslinking or curing of the binder composition. Suitable temperatures for curing the binder compositions can range from a low of about 20° C., about 30° C., or about 40° C. to a high of about 150° C., about 200° C., or about 250° C. The composite material combined with the binder composition, e.g., wood chips and/or fibers, can be pressed to form more compact or dense product than would otherwise be produced without the applied pressure. Suitable pressures for curing the binder compositions applied to a composite material can range from a low of about 101 kPa, about 1 MPa, or about 2 MPa to a high of about 5 MPa, about 7 MPa, about 10 MPa, or about 14 MPa.

The tannin, multifunctional aldehyde compound, and Lewis acid can be combined with one another at any suitable ratio to form the binder compositions. The binder composition can include the tannin in an amount ranging from a low of about 60 wt %, about 70 wt %, or about 80 wt % to a high of about 85 wt %, about 90 wt %, about 95 w %, or about 99 wt %, based on the combined solids weight of the tannin, multifunctional aldehyde compound, and Lewis acid. For example, the binder composition can include the tannin in an amount ranging from about 75 wt % to about 98 wt %, about 80 wt % to about 97 wt %, about 82 wt % to about 95 wt %, about 85 wt % to about 92 wt %, or about 87 wt % to about 90 wt %, based on the combined solids weight of the tannin, multifunctional aldehyde compound, and Lewis acid. The binder composition can include the multifunctional aldehyde compound in an amount ranging from a low of about 1 wt %, about 3 wt %, about 5 wt % or about 10 wt % to a high of about 15 wt %, about 25 wt %, about 35 wt %, or about 40 wt %, based on the combined solids weight of the tannin, multifunctional aldehyde compound, and Lewis acid. For example, the binder composition can include the multifunctional aldehyde compound in an amount ranging from about 2 wt % to about 22 wt %, about 4 wt % to about 20 wt %, about 6 wt % to about 18 wt %, about 8 wt % to about 16 wt %, or about 10 wt % to about 14 wt %, based on the combined solids weight of the tannin, multifunctional aldehyde compound, and Lewis acid. The binder composition can include the Lewis acid in an amount ranging from a low of about 0.05 wt %, about 0.1 wt %, or about 0.5 wt % to a high of about 2 wt %, about 3 wt %, or about 4 wt %, based on the combined solids weight of the tannin, multifunctional aldehyde compound, and Lewis acid. For example, the binder composition can include the Lewis acid in an amount ranging from about 0.2 wt % to about 2.5 wt %, about 0.3 wt % to about 2.2 wt %, about 0.5 wt % to about 1.8 wt %, about 0.3 wt % to about 1.3 wt %, about 0.4 wt % to about 1.5 wt %, or about 0.4 wt % to about 0.8 wt %, based on the combined solids weight of the tannin, the multifunctional aldehyde compound, and the Lewis acid.

In another example, the binder composition can include about 80 wt % to about 95 wt % of the tannin, about 5 wt % to about 20 wt % of the multifunctional aldehyde compound, and about 0.05 wt % to about 4 wt % Lewis acid, based on the combined solids weight of the tannin, the multifunctional aldehyde compound, and the Lewis acid. In still another example, the binder composition can include about 85 wt % to about 90 wt % of the tannin, about 10 wt % to about 15 wt % of the multifunctional aldehyde compound, and about 0.2 wt % to about 1.5 wt % of the Lewis acid, based on the combined solids weight of the tannin, the multifunctional aldehyde compound, and the Lewis acid. In yet another example, the binder composition can include about 85 wt %, about 86 wt %, about 87 wt %, about 88 wt %, about 89 wt %, or about 90 wt % of the tannin, about 14 wt %, about 13 wt %, about 12 wt %, about 11 wt %, or about 10 wt % of the multifunctional aldehyde compound, and about 0.4 to about 1 wt % of the Lewis acid, based on the combined solids weight of the tannin, the multifunctional aldehyde compound, and the Lewis acid. The amount of the base compound in the binder composition can be sufficient to adjust the pH of the combined tannin, multifunctional aldehyde compound, and Lewis acid, which as discussed above can range from about 4 to about 14.

The tannin, multifunctional aldehyde compound, Lewis acid, and/or base compound can be combined with a liquid medium. For example, the tannin, multifunctional aldehyde compound, Lewis acid, and/or base compound can be separately combined with a liquid medium and then combined with one another to produce the binder composition. In another example, the tannin, multifunctional aldehyde compound, Lewis acid, and/or base compound can be combined with one another to produce the binder composition and a liquid medium can then be added to the binder composition.

Illustrative liquid mediums can include, but are not limited to, water, alcohols, glycols, acetonitrile, dimethyl sulfoxide, N,N-dimethylformamide, N-methylpyrrolidone, or any combination or mixture thereof. Suitable alcohols can include, but are not limited to, methanol, ethanol, propanol, isopropanol, butanol, or any combination or mixture thereof. Suitable glycols can include, but are not limited to, ethylene glycol, propylene glycol, or a combination thereof. As used herein, the terms "aqueous medium" and "aqueous liquid" can be or include water and/or mixtures composed of water and/or other water-miscible solvents. Illustrative water-miscible solvents can include, but are not limited to, alcohols, ethers, amines, other polar aprotic solvents, and the like.

Any one or more of the tannin, the multifunctional aldehyde compound, the Lewis acid, and/or the base compound combined with a liquid medium can have a total concentration of solids ranging from about 1 wt % to about 99 wt %. For example, the tannin combined with a liquid medium can have a concentration of solids ranging from a low of about 5 wt %, about 10 wt %, about 15 wt %, or about 20 wt % to a high of about 40 wt %, about 50 wt %, about 60 wt %, about 70 wt %, or about 80 wt %, based on the combined weight of the tannin and the liquid medium. Similarly, the multifunctional aldehyde compound combined with a liquid medium can have a concentration of solids ranging from a low of about 5 wt %, about 10 wt %, about 15 wt %, or about 20 wt % to a high of about 40 wt %, about 50 wt %, about 60 wt %, about 70 wt %, or about 80 wt %, based on the combined weight of the multifunctional aldehyde compound and the liquid medium. The Lewis acid combined with a liquid medium can also have a concentration of solids ranging from a low of about 5 wt %, about 10 wt %, about 15 wt %, or about 20 wt % to a high of about 40 wt %, about 50 wt %, about 60 wt %, about 70 wt %, or about 80 wt %, based on the combined weight of the Lewis acid and the liquid medium. Similarly, the base compound combined with a liquid medium can also have a concentration of solids ranging from a low of about 5 wt %, about 10 wt %, about 15 wt %, or about 20 wt % to a high of about 40 wt %, about 50 wt %, about 60 wt %, about 70 wt %, or about 80 wt %, based on the combined weight of the base compound and liquid medium. In at least one example, one or more of the tannin, multifunctional aldehyde compound, Lewis acid, and base compound can be combined with water to form aqueous mixtures and those aqueous mixtures can then be combined to produce the binder composition. For example, any one or more of the tannin, multifunctional aldehyde compound, Lewis acid, and base compound can be an aqueous solution having a solids content ranging from about 1 wt % to about 70 wt %, about 5 wt % to about 60 wt %, about 10 wt % to about 50 wt %, about 20 wt % to about 60 wt %, or about 30 wt % to about 50 wt %.

As used herein, the solids content of the tannin, multifunctional aldehyde compound, Lewis acid, and base compound when combined with a liquid medium, as understood by those skilled in the art, can be measured by determining the weight loss upon heating a small sample, e.g., 1-5 grams of the tannin/liquid medium, multifunctional aldehyde compound/liquid medium, Lewis acid/liquid medium, or the base compound/liquid medium to a suitable temperature, e.g., 125° C., and a time sufficient to remove the liquid. By measuring the weight of the sample before and after heating, the percent solids in the sample can be directly calculated or otherwise estimated.

In addition to the tannin, multifunctional aldehyde compound, Lewis acid, and/or base compound, and/or liquid medium, the binder composition can also include one or more additives. The additives can be combined with the tannin, multifunctional aldehyde compound, Lewis acid, base compound, the binder composition, or any combination or mixture thereof. Illustrative additives can include, but are not limited to, waxes or other hydrophobic additives, water, filler material(s), extenders, surfactants, release agents, dyes, fire retardants, formaldehyde scavengers, biocides, or any combination or mixture thereof. For composite wood products, such as plywood, typical filler material(s) can include, but are not limited to, ground pecan and/or walnut shells, and typical extenders can include, for example, wheat flour. Other suitable extenders can include, but are not limited to, polysaccharides, sulfonated lignins, and the like. Illustrative polysaccharides can include, but are not limited to, starch, cellulose, gums, such as guar and xanthan, alginates, pectin, gellan, or any combination or mixture thereof. Suitable polysaccharide starches can include, for example maize or corn, waxy maize, high amylose maize, potato, tapioca, and wheat starch. Other starches such as genetically engineered starches can include high amylose potato and/or potato amylopectin starches. Illustrative sulfonated lignins can include, but are not limited to, sodium lignosulfonate and ammonium lignosulfonate. If the binder composition includes one or more additives, the amount of each additive can range from a low of about 0.01 wt %, about 0.5 wt %, about 1, wt %, about 3 wt %, or about 5 wt % to a high of 20 wt %, about 30 wt %, about 40 wt %, or about 50 wt %, based on the combined solids weight of the tannin, multifunctional aldehyde compound, and Lewis acid.

The tannin, multifunctional aldehyde compound, Lewis acid, and if present, base compound and/or liquid medium can be mixed, blended, or otherwise combined in any device, system, apparatus, or any combination of devices, systems, and/or apparatus suitable for batch, intermittent, and/or continuous mixing of two or more components. Illustrative mixing, blending, or other combining device, system, apparatus, or combination thereof, which can be referred to as "mixing equipment," can include, but is not limited to, mechanical mixer agitation, ejectors, static mixers, mechanical/power mixers, shear mixers, sonic mixers, or combinations thereof. The mixing equipment can include one or more heating jackets, heating coils, internal heating elements, cooling jacks, cooling coils, internal cooling elements, or the like, which can heat and/or cool any two or more of the components of the binder composition when combined. The mixing equipment can also include one or more introduction nozzles, fluid distribution grids, or other device(s) for introducing the components of the binder composition to the mixing equipment. The mixing equipment can be or include one or more open vessels or containers. The mixing equipment can be or include one or more enclosed bodies or containers capable of carrying out the mixing under vacuum, at atmospheric pressure, and/or at a pressure greater than atmospheric pressure. The mixing equipment can also be or include one or more pipes, tubes, conduits, or other structures, capable of mixing any two or more of the components of the binder composition. For example, any two or more of the binder composition components can be mixed inline, e.g., a conduit of a binder composition delivery or application system.

As discussed and described above, the multifunctional aldehyde compound, the Lewis acid, and the tannin can begin to crosslink with one another upon contact. The crosslinking reactions generally occur more rapidly under alkaline or basic conditions. Accordingly, the binder composition preferably has a pH of about 7 to about 14. The rate at which the crosslinking reactions can occur, as also noted above can depend, at least in part, on the particular tannin and/or multifunctional aldehyde compound. Accordingly, the crosslinking reactions can occur under acidic conditions, e.g., a pH from about 4 up to about 7. Crosslinking causes the mixture of tannin, Lewis acid, and multifunctional aldehyde compound to thicken or gel. The rate at which the crosslinking reactions occur can affect what is commonly referred to as the binder composition "pot life" or "shelf life."

As the crosslinking reactions between the tannin and the multifunctional aldehyde compound progresses the viscosity of the binder composition increases. Depending on the particular use or application for the binder composition, the viscosity of the binder composition can increase to a point at which it can no longer be efficiently or effectively applied, e.g., to a wood and/or fiber composite. When the viscosity of the binder composition increase causes the binder composition to be too thick for use the usable pot life of the binder can be said to have been exceeded. The viscosity of the binder composition can range from a low of about 100 centipoise ("cP"), about 500 cP, about 1,000 cP, or about 1,500 cP to a high of about 3,000 cP, about 5,000 cP, about 8,500 cP, or about 10,000 cP. Preferably the viscosity of the binder composition is less than about 10,000 cP, less than about 8,000 cP, less than about 6,500 cP, or less than about 5,000 cP. The viscosity of the binder composition can be determined using a Brookfield Viscometer at a temperature of 25° C.

A long pot life for the binder compositions can be beneficial; however, a pot life on the order of seconds or only a few minutes can be more than acceptable. For example, the binder compositions discussed and described above and elsewhere herein can have pot life of about 30 seconds, about 45 seconds, about 1 minute, about 2 minutes, about 3 minutes, about 4 minutes, about 5 minutes, about 7 minutes, about 10 minutes, about 15 minutes, about 20 minutes, about 30 minutes, or more. However, the pot life of the binder composition can be extended if desired. Extending the pot life of the binder composition can allow for process upsets that can potentially be encountered during the production of products such as composite wood products and/or composite fiber products. In another example, extending the pot life of the binder composition can allow for off-site production of the binder composition. In other words, if the pot life of the binder composition is sufficiently long, the binder composition can be produced at one facility and transported to another facility that produces one or more products that use the binder composition, e.g., composite wood products and/or composite fiber products.

One way to reduce or prevent the crosslinking reactions between the tannins and multifunctional aldehyde compounds in the binder composition can be to reduce the temperature of the binder composition. For example, the temperature of the binder composition can be reduced to about 20° C. or less, about 15° C. or less, about 10° C. or less, about 5° C. or less, or about 0° C. or less. In another example, the temperature of the binder composition can be reduced to a temperature less than an ambient or "room" temperature.

Another way to reduce or prevent the crosslinking reactions between the tannins and the multifunctional aldehyde compounds in the binder compositions can include encapsulation of one, two, three, or four of the tannin, multifunctional aldehyde compound, Lewis acid, and, if present, base compound. For example, the multifunctional aldehyde compound can be contained within a capsule or other enclosed shell or container to inhibit or prevent direct contact when combined with the tannins. In another example, the base compound can be contained within a plurality of capsules or other enclosed shells or containers, which can allow the pH of the tannin and multifunctional aldehyde compound that are in contact with one another to be below about 7 or below about 6, for example. In another example, the Lewis acid can be contained within a plurality of capsules or other enclosed shells or containers. Depending, at least in part, on the particular tannins and/or multifunctional aldehyde compounds, the crosslinking reactions can be slowed, prevented, reduced, or otherwise inhibited when the pH of the tannin and multifunctional aldehyde compound is at a pH of about 2 to 6 or about 4 to about 6, for example.

The capsules can break, burst, or fracture, or otherwise permit the compound(s) contained therein to escape at a desired time or after a desired time. For example, pressure and/or heat applied to wood composite and/or composite fiber to which the binder composition has been applied can cause the capsules to fracture, releasing the compound(s) contained within the capsules and allowing the crosslinking reactions between the multifunctional aldehyde compound and tannin to occur.

The capsules, if used to encapsulate the tannin, multifunctional aldehyde compound, Lewis acid, and/or base compound can be micro-capsules. Micro-capsules can have an average cross-sectional size ranging from about 0.25 μm to about 1,000 μm. For example, the micro-capsules can have an average cross-sectional size ranging from a low of about 1 μm, about 5 μm, or about 10 μm to a high of about 100 μm, about 200 μm, about 400 μm, or about 600 μm. The capsules, if used to encapsulate the tannin, multifunctional aldehyde compound, Lewis acid, and/or base compound, can be macro-capsules. Macro-capsules can have an average cross-sectional size ranging from about 1,000 μm to about 10,000 μm. For example, the macro-capsules can have an average cross-sectional size ranging from a low of about 1,000 μm, about 1,500 μm, or about 2,000 μm to a high of about 5,000 μm, about 7,000 μm, or about 9,000 μm. Techniques for the encapsulation of various compounds are discussed and described in U.S. Pat. Nos. 4,536,524; 5,435,376; 5,532,293; 5,709,340; 5,911,923; 5,919,407; 5,919,557; 6,004,417; 6,084,010; 6,592,990; 6,703,127; 6,835,334; 7,286,279; 7,300,530; 7,309,500; 7,323,039; 7,344,705; 7,376,344; 7,550,200.

Preparation of the capsules can include, but is not limited to, interfacial polymerization, phase separation processes, or coacervation processes. Encapsulation methods can also include reaction in an aqueous medium conducted in the presence of negatively-charged, carboxyl-substituted, linear aliphatic hydrocarbon polyelectrolyte material dissolved in the aqueous medium, or reaction in the presence of gum arabic, or reaction in the presence of an anionic polyelectrolyte and an ammonium salt of an acid.

Numerous patents discuss and describe the various techniques that can be used to encapsulate various compounds using various encapsulation materials. For example, U.S. Pat. No. 7,323,039 discloses emulsion methods for preparing core/shell microspheres using an in-water drying method, after which the microspheres are recovered from the emulsion by centrifuging, filtering, or screening. U.S. Pat. No. 7,286,279 discloses microencapsulation processes and compositions prepared in a solution comprising a polymer precursor such as a monomer, chain extender, or oligomer; emulsifying the precursor into a fluorinated solvent; and forming micro-particles by hardening the emulsion by polymerization/crosslinking the precursor, including interfacial and/or in-situ polymerization/crosslinking. U.S. Pat. No. 7,376,344 discloses heat sensitive encapsulation. U.S. Pat. No. 7,344,705 discloses preparation of low density microspheres using a heat expansion process, where the microspheres include biocompatible synthetic polymers or copolymers. U.S. Pat. Nos. 7,309,500 and 7,368,130 disclose methods for forming micro-particles, where droplets of chitosan, gelatin, hydrophilic polymers such as polyvinyl alcohol, proteins, peptides, or other materials can be charged in an immiscible solvent to prevent them from coalescing before hardening, optionally treating the gelated micro-particles with a crosslinking agent to modify their mechanical properties. U.S. Pat. No. 7,374,782 discloses the production of microspheres of a macromolecule such as protein mixed with a water-soluble polymer under conditions which permit the water-soluble polymer to remove water from the protein in contact with a hydrophobic surface. U.S. Pat. No. 7,297,404 discloses coacervative microencapsulation, which is followed by phase separation and cross-linking. U.S. Pat. No. 7,375,070 discloses microencapsulated particles with outer walls including water-soluble polymers or polymer mixtures as well as enzymes. U.S. Pat. No. 7,294,678 discloses a polynitrile oxide or polynitrile oxide dispersion microencapsulated within a barrier material coating prior to compounding it into a rubber mixture to prevent premature reaction with rubber particles. U.S. Pat. No. 7,368,613 discloses microencapsulation using capsule materials made of wax-like plastics materials such as polyvinyl alcohol, polyurethane-like substances, or soft gelatin. U.S. Pat. Nos. 4,889,877; 4,936,916; and 5,741,592 are also related to microencapsulation.

Suitable capsule or shell materials can be or include any one or more of a number of different materials. For example, the capsule or shell material can include natural polymers, synthetic polymers, synthetic elastomers, and the like. Illustrative natural polymers can include, but are not limited to, carboxymethylcellulose, zein, cellulose acetate phthalate, nitrocellulose, ethylcellulose, propylhydroxycellulose, gelatin, shellac, gum Arabic, succinylated gelatin, starch, paraffin waxes, bark, proteins, methylcellulose, kraft lignin, arabinogalactan, natural rubber, or any combination or mixture thereof. Illustrative synthetic polymers can include, but are not limited to, polyvinyl alcohol, polyvinyidene chloride, polyethylene, polyvinyl chloride, polypropylene, polyacrylate, polystyrene, polyacrylonitrile, polyacrylamide, chlorinated polyethylene, polyether, acetal copolymer, polyester, polyurethane, polyamide, polyvinylpyrrolidone, polyurea, poly(p-xylylene), epoxy, polymethyl methacrylate, ethylene-vinyl, polyhydroxyethyl, acetate copolymer, methacrylate, polyvinyl acetate, or any combination or mixture thereof. Illustrative synthetic elastomers can include, but are not limited to, polybutadiene, acrylonitrile, polyisoprene, nitrile, neoprene, butyl rubber, chloroprene, polysiloxane, styrene-butadiene rubber, hydrin rubber, silicone rubber, ethylene-propylene-diene terpolymers, or any combination or mixture thereof.

Another way to extend the pot life of the binder compositions can be to block the multifunctional aldehyde compound with one or more blocking components or blocking agents. Blocking the multifunctional aldehyde compounds can reduce or inhibit the crosslinking reactions between the tannin and the multifunctional aldehyde compounds. As such, blocking the multifunctional aldehyde compound can be used to form a stable binder composition that does not crosslink to a substantial degree prior to curing of the binder composition. In other words, by blocking the multifunctional aldehyde compound, the reactivity between the tannin and the multifunctional aldehyde compound can be inhibited or slowed, thus providing control of when the crosslinking reactions occur. For example, the crosslinking reactions can be delayed until the binder composition has been applied to the plurality of substrates, e.g., wood substrates and/or fibers, and the blocking component can be deactivated, e.g., removed, by heat and/or pressure, for example, which can then cause the tannin and multifunctional aldehyde compound to react.

The multifunctional aldehyde compound can be blocked by reaction with a blocking component becoming a blocked multifunctional aldehyde compounds. Suitable blocking components can include, but are not limited to, urea, substituted ureas (e g., dimethyl urea), various cyclic ureas (e.g., ethylene urea, substituted ethylene ureas such as 4,5-dihydroxyethylene urea, propylene urea, and substituted propylene ureas such as 4-hydroxy-5-methylpropylene urea), carbamates (e.g., isopropyl or methyl carbamate), glycols (e.g., ethylene glycol and dipropylene glycol), polyols (e.g., containing at least three hydroxy groups such as glycerin).

The reaction of the multifunctional aldehyde compounds and the blocking component, e.g., a urea or cyclic urea, can occur within the temperature range of about 25° C. to about 100° C. or about 40° C. to about 80° C. In general the pH of the reactants and the resultant blocked multifunctional aldehyde compounds can have a pH ranging from a low of about 2.5, about 3, about 3.5, or about 4 to a high of about 7, about 8, about 9, or about 10. Additional process conditions for preparing blocked multifunctional aldehyde compounds and suitable blocking components can be as discussed and described in U.S. Pat. Nos. 4,695,606; 4,625,029; 4,656,296; and 7,807,749.

It should be noted that encapsulation, cooling, and/or the addition of blocking components are not necessary to produce the binder compositions. Encapsulation, cooling, and/or the blocking components can be used, if desired, to extend the pot life of the binder compositions.

The binder compositions can be used to make, produce, or otherwise prepare a variety of products. The binder composition can be applied to the plurality of substrates, which can be formed into a desired shape before or after application of the binder composition, and then the binder composition can be at least partially cured to produce a product.

The substrates can include, but are not limited to, organic based substrates, inorganic based substrates, or a combination thereof. Suitable organic based substrates can include but are not limited to, lignocellulose material or lignocellulose substrates (substrates that include both cellulose and lignin), straw, hemp, sisal, cotton stalk, wheat, bamboo, sabai grass, rice straw, banana leaves, paper mulberry (i.e., bast fiber), abaca leaves, pineapple leaves, esparto grass leaves, fibers from the genus *Hesperaloe* in the family Agavaceae jute, salt water reeds, palm fronds, flax, ground nut shells, hardwoods, softwoods, recycled fiberboards such as high density fiberboard, medium density fiberboard, low density fiberboard, oriented strand board, particleboard, animal fibers (e.g., wool, hair), recycled paper products (e.g., newspapers, cardboard, cereal boxes, and magazines), or any combination or mixture thereof. For example, organic based substrates can be or include wood, for example hardwoods, softwoods, or a combination thereof. Illustrative types of wood can include, but are not limited to, Alder, Ash, Aspen, Basswood, Beech, Birch, Cedar, Cherry, Cottonwood, Cypress, Elm, Fir, Gum, Hackberry, Hickory, Maple, Oak, Pecan, Pine, Poplar, Redwood, Sassafras, Spruce, Sycamore, Walnut, and Willow. Inorganic based fibers can include, but are not limited to plastic fibers (e.g., polypropylene fibers, polyethylene fibers, polyvinyl chloride fibers, polyester fibers, polyamide fibers, polyacrylonitrile fibers), glass fibers, glass wool, mineral fibers, mineral wool, synthetic inorganic fibers (e.g., aramid fibers, carbon fibers), ceramic fibers, and any combination thereof. Organic and inorganic based fibers can be combined to provide the fibers in the fiberboard.

The starting material, from which the substrates can be derived from, can be reduced to the appropriate size by various processes such as hogging, grinding, hammer milling, tearing, shredding, and/or flaking. Suitable forms of the substrates can include, but are not limited to, chips, fibers, shavings, sawdust or dust, or the like. The substrates can have a length ranging from a low of about 0.05 mm, about 0.1 mm, about 0.2 mm to a high of about 1 mm, about 5 mm, about 10 mm, about 20 mm, about 30 mm, about 40 mm, about 50 mm, or about 100 mm.

Illustrative composite wood products or articles produced using the binder compositions can include, but are not limited to, particleboard, fiberboard such as medium density fiberboard ("MDF") and/or high density fiberboard ("HDF"), plywood such as hardwood plywood and/or softwood plywood, oriented strand board ("OSB"), laminated veneer lumber ("LVL"), laminated veneer boards ("LVB"), and the like.

The production of wood containing and other substrate containing products can include contacting a plurality of substrates with the binder composition. The substrates can be contacted with the binder composition by spraying, coating, mixing, brushing, falling film or curtain coater, dipping, soaking, or the like. After contacting the plurality of substrates with the binder composition, the binder composition can be at least partially cured. At least partially curing the binder composition can include applying heat and/or pressure thereto. The binder composition can also at least partially cure at room temperature and pressure. The substrates contacted with the binder composition can be formed into a desired shape, e.g., a board, a woven mat, or a non-woven mat. The substrates contacted with the binder composition can be formed into a desired shape before, during, and/or after partial curing of the binder composition. Depending on the particular product, the substrates contacted with the binder composition can be pressed before, during, and/or after the binder composition is at least partially cured. For example, the substrates contacted with the binder composition can be consolidated or otherwise formed into a desired shape, if desired pressed to a particular density and thickness, and heated to at least partially cure the binder composition. In another example, a blended furnish, i.e., a mixture of the substrates and the binder composition, can be extruded through a die (extrusion process) and heated to at least partially cure the binder composition.

The pressure applied in producing the product can depend, at least in part, on the particular product. For example, the amount of pressure applied to a particleboard process can range from about 1 MPa to about 5 MPa or from about 2 MPa to about 4 MPa. In another example, the amount of pressure applied to a MDF product can range from about 2 MPa to about 14 MPa or from about 2 MPa to about 7 MPa or from about 3 MPa to about 6 MPa. The temperature the product can be heated to produce an at least partially cured product can range from a low of about 100° C., about 125° C., about 150° C., or about 170° C. to a high of about 180° C., about 200° C., about 220° C., or about 250° C. The length of time the pressure can be applied can range from a low of about 30 seconds, about 1 minute, about 3 minutes, about 5 minutes, or about 7 minutes to a high of about 10 minutes, about 15 minutes, about 20 minutes, or about 30 minutes, which can depend, at least in part, on the particular product and/or the particular dimensions, e.g., thickness of the product.

For wood based or wood containing products such as particleboard, fiberboard, plywood, and oriented strand board, the amount of the binder composition applied to the cellulose material can range from a low of about 3 wt %, about 4 wt %, about 5 wt % or about 6 wt % to a high of about 10 wt %, about 12 wt %, about 15 wt %, or about 20 wt %, based on a weight of the wood based or wood containing material. For example, a wood composite product can contain from about 5 wt % to about 15 wt %, about 8 wt % to about 14 wt %, about 10 wt % to about 12 wt %, or about 7 wt % to about 10 wt % binder composition, based on a weight of the wood based or wood containing material.

Wood based or wood containing products such as particleboard, fiberboard, plywood, and oriented strand board, can have a thickness ranging from a low of about 1.5 mm, about 5 mm, or about 10 mm to a high of about 30 mm, about 50 mm, or about 100 mm. Wood based or wood containing products can be formed into sheets or boards. The sheets or boards can have a length of about 1.2 m, about 1.8 m, about 2.4 m, about 3 m, or about 3.6 m. The sheets or boards can have a width of about 0.6 m, about 1.2 m, about 1.8 m, about 2.4 m, or about 3 m.

As used herein, the terms "curing," "cured," and similar terms are intended to embrace the structural and/or morphological change that occurs in a the binder composition, such as by covalent chemical reaction (crosslinking), ionic interaction or clustering, improved adhesion to the substrate, phase transformation or inversion, and/or hydrogen bonding when the binder composition is at least partially cured to cause the properties of a flexible, porous substrate, such as a mat or blanket of fibers, especially glass fibers, and/or a rigid or semi-rigid substrate, such as a wood or other cellulose containing board or sheet, to which an effective amount of the binder composition has been applied, to be altered.

Another class or type of products for which the binder composition can be used to produce or make can include fiber mats and other fiber containing products. Fiber mats can be manufactured in a wet-laid or dry-laid process. In a wet-laid process, chopped bundles of fibers, having suitable length and diameter, can be introduced to an aqueous dispersant medium to produce an aqueous fiber slurry, known in the art as "white water." The white water can typically contain about 0.5 wt % fibers. The fibers can have a diameter ranging from about 0.5 µm to about 30 µm and a length ranging from about 5 mm to about 50 mm, for example. The fibers can be sized or unsized and wet or dry, as long as the fibers can be suitably dispersed within the aqueous fiber slurry.

The fiber slurry, diluted or undiluted, can be introduced to a mat-forming machine that can include a mat forming screen, e.g., a wire screen or sheet of fabric, which can form a fiber product and can allow excess water to drain therefrom, thereby forming a wet or damp fiber mat. The fibers can be collected on the screen in the form of a wet fiber mat and excess water is removed by gravity and/or by vacuum assist. The removal of excess water via vacuum assist can include one or more vacuums.

The binder composition can be formulated as a liquid and applied onto the dewatered wet fiber mat. Application of the binder composition can be accomplished by any conventional means, such as by soaking the mat in an excess of binder composition solution or suspension, a falling film or curtain coater, spraying, dipping, or the like. Excess binder composition can be removed, for example under vacuum.

The binder composition, after it is applied to the fibers, can be at least partially cured. For example, the fiber product can be heated to effect final drying and full curing. The duration and temperature of heating can affect the rate of proccessability and handleability, degree of curing and property development of the treated substrate. The curing temperature can be within the range of from about 50° C. to about 300° C., preferably within the range of from about 90° C. to about 230° C. and the curing time will usually be somewhere between 1 second to about 15 minutes. On heating, water present in the binder composition evaporates, and the composition undergoes curing.

The drying and curing of the binder composition can be conducted in two or more distinct steps. For example, the binder composition can be only partially cured at a first time and later more fully or fully cured. For example, an insufficient amount of the Lewis acid can be added to the binder composition to produce a binder composition incapable of or very slow to arrive at a fully cured binder composition. Such a preliminary procedure, referred to as "B-staging," may be used to provide a binder composition treated product, for example, in roll form, which may at a later stage be fully cured, with or without forming or molding into a particular configuration, concurrent with the curing process. This makes it possible, for example, to use fiber products which can be molded and cured elsewhere. If the binder composition is deficient in the Lewis acid such that only partial curing of the binder composition is realized, additional Lewis acid can be added to the at least partially cured composite product at a later time. After adding additional Lewis acid, the binder composition can then be more fully or fully cured.

The binder composition can be blended with other additives or ingredients commonly used in compositions for preparing fiber products and diluted with additional water to a desired concentration which is readily applied onto the fibers, such as by a curtain coater. Illustrative additives can include, but are not limited to, dispersants, biocides, viscosity modifiers, pH adjusters, coupling agents, surfactants, lubricants, defoamers, and the like. For example, the binder composition or adhesive can be added to an aqueous solution ("white water") of polyacrylamide ("PAA"), amine oxide ("AO"), or hydroxyethylcellulose ("HEC"). In another example, a coupling agent (e.g., a silane coupling agent, such as an organo silicon oil) can also be added to the solution. In another example, a coupling agent can be incorporated in a coating on the fibers.

The fiber product can be formed as a relatively thin product having a thickness of about 0.1 mm to about 6 mm. In another example, a relatively thick fiber product having a thickness of about 10 cm to about 50 cm, or about 15 cm to about 30 cm, or about 20 cm to about 30 cm can be formed. In another example, the fiber product can have a thickness ranging from a low of about 0.1 mm, about 1 mm, about 1.5 mm, or about 2 mm to a high of about 5 mm, about 1 cm, about 5 cm, about 10 cm, about 20 cm, about 30 cm, about 40 cm, or about 50 cm. Depending on formation conditions, the density of the product can also be varied from a relatively fluffy low density product to a higher density of about 6 to about 10 pounds per cubic foot or higher. The fiber mat product can have a basis weight ranging from a low of about 0.1 pound, about 0.5 pounds, or about 0.8 pounds to a high of about 3 pounds, about 4 pounds, or about 5 pounds per 100 square feet. For example, the fiber mat product can have a basis weight of from about 0.6 pounds per 100 square feet to about 2.8 pounds per 100 square feet, about 1 pound per 100 square feet to about 2.5 pounds per 100 square feet, or about 1.5 pounds per 100 square feet to about 2.2 pounds per 100 square feet. In at least one specific embodiment, the fiber mat product can have a basis weight of about 1.2 pounds per 100 square feet, about 1.8 pounds per 100 square feet, or about 2.4 pounds per 100 square feet.

The fibers can represent the principal material of the nonwoven fiber products, such as a fiber mat product. For example, 60 wt % to about 95 wt % of the fiber product, based on the combined amount of binder composition and fibers can be composed of the fibers. The binder composition can be applied in an amount such that the cured binder composition constitutes from about 1 wt % to about 40 wt % of the finished glass fiber product. The binder composition can be applied in an amount such that the cured resin constitutes a low of from about 1 wt %, about 5 wt %, or about 10 wt % to a high of about 15 wt %, about 20 wt %, or about 25 wt %, based on the combined weight of the resin and the fibers.

As used herein, the terms "fiber," "fibrous," "fiberglass," "fiber glass," "glass fibers," and the like are refer to materials or substrates that have an elongated morphology exhibiting an aspect ratio (length to thickness) of greater than 100, generally greater than 500, and often greater than 1000. Indeed, an aspect ratio of over 10,000 is possible. Suitable fibers can be glass fibers, natural fibers, synthetic fibers, mineral fibers, ceramic fibers, metal fibers, carbon fibers, or any combination or mixture thereof. Illustrative glass fibers can include, but are not limited to, A-type glass fibers, C-type glass fibers, E-type glass fibers, S-type glass fibers, ECR-type glass fibers, wool glass fibers, and any combination thereof. The term "natural fibers," as used herein refers to plant fibers extracted from any part of a plant, including, but not limited to, the stem, seeds, leaves, roots, or phloem. Illustrative natural fibers can include, but are not limited to, cotton, jute, bamboo, ramie, bagasse, hemp, coir, linen, kenaf, sisal, flax, henequen, and any combination thereof. Illustrative synthetic fibers can include, but are not limited to, synthetic polymers, such as polyester, polyamide, aramid, and any combination thereof. In at least one specific embodiment, the fibers can be glass fibers that are wet use chopped strand ("WUCS") glass fibers. Wet use chopped strand glass fibers can be formed by conventional processes known in the art. The WUCS glass fibers can have a moisture content ranging from a low of about 5%, about 8%, or about 10% to a high of about 20%, about 25%, or about 30%.

Prior to using the fibers to make a fiber product, the fibers can be allowed to age for a period of time. For example, the fibers can be aged for a period of a few hours to several weeks before being used to make a fiber product. For some fiber mat products, e.g., glass fiber products, the fibers can typically be aged for about 3 to about 30 days. Ageing the fibers includes simply storing the fibers at room temperature for the desired amount of time prior to being used in making a fiber product.

The binder composition discussed and described above or elsewhere herein can be used to produce a variety of fiber products. The fiber products can be used by themselves or incorporated into a variety of other products. For example, fiber products can be used as produced or incorporated into insulation batts or rolls, composite flooring, asphalt roofing shingles, siding, gypsum wall board, roving, microglass-based substrate for printed circuit boards, battery separators, filter stock, tape stock, carpet backing, and as reinforcement scrim in cementitious and non-cementitious coatings for masonry.

Any one or more of the binder compositions discussed and described above can be combined with one or more additional or second binder or adhesive compositions to produce a binder or adhesive system (multi-binder system). The one or more second binder compositions or adhesives can be different from the one or more binder compositions discussed and described above. For example the second binder or adhesive composition can be free from at least one of the tannins, multifunctional compound, and Lewis acid.

Illustrative additional or second binder or adhesive compositions can include, but are not limited to, aldehyde containing or aldehyde based resin; a reaction product of Maillard reactants; a copolymer of one or more vinyl aromatic derived units and at least one of maleic anhydride and maleic acid; a polyamideoamine-epichlorhydrin polymer; a mixture and/or reaction product of a polyamidoamine and ammonia-epichlorhydrin adduct binder; a mixture and/or reaction product of a polyamidoamine-epichlorhydrin polymer and at least one of a soy protein, a wheat protein, a pea protein, a corn protein, and a guar protein; an adduct or polymer of styrene, at least one of maleic anhydride and maleic acid, and at least one of an acrylic acid and an acrylate; a polyacrylic acid based binder; polyvinyl acetate; polymeric methylene diisocyanate ("pMDI"); starch; protein; lignin; or any combination thereof. Illustrative aldehyde containing or aldehyde based resins can include, but are not limited to, urea-aldehyde polymers, melamine-aldehyde polymers, phenol-aldehyde polymers, resorcinol-aldehyde resins, or any combination or mixture thereof. Combinations of aldehyde based resins can include, for example, melamine-urea-aldehyde, phenol-urea-aldehyde, and phenol-melamine-aldehyde.

Illustrative aldehyde based resins can include, but are not limited to, one or more amino-aldehyde resins, phenol-aldehyde resins, dihydroxybenzene or "resorcinol"-aldehyde resins, or any combination or mixture thereof. The amino component of the amino-aldehyde resins can be or include, but is not limited to, urea, melamine, or a combination thereof. The aldehyde based resins can include, but are not limited to, urea-formaldehyde ("UF") resins, phenol-formaldehyde ("PF") resins, melamine-formaldehyde ("MF") resins, resorcinol-formaldehyde ("RF") resins, styrene-acrylic acid; acrylic acid maleic acid copolymer, or any combination or mixture thereof. Combinations of amino-aldehyde resins can include, for example, melamine-urea-formaldehyde ("MUF"), phenol-urea-formaldehyde ("PUF") resins, phenol-melamine-formaldehyde ("PMF") resins, phenol-resorcinol-formaldehyde ("PRF") resins, and the like.

Suitable aldehyde compounds for making the amino-aldehyde resins, phenol-aldehyde resins, and/or dihydroxybenzene or "resorcinol"-aldehyde resins can include, but are not limited to, unsubstituted aldehyde compounds and/or substituted aldehyde compounds. For example, suitable aldehyde compounds can be represented by the formula RCHO, wherein R is hydrogen or a hydrocarbon radical. Illustrative hydrocarbon radicals can include from 1 to about 8 carbon atoms. In another example, suitable aldehyde compounds can also include the so-called masked aldehydes or aldehyde equivalents, such as acetals or hemiacetals. Illustrative aldehyde compounds can include, but are not limited to, formaldehyde, paraformaldehyde, acetaldehyde, propionaldehyde, butyraldehyde, furfuraldehyde, benzaldehyde, or any combination or mixture thereof. One or more other aldehydes, such as glyoxal can be used in place of or in combination with formaldehyde and/or other aldehydes. In at least one example, the aldehyde compound can include formaldehyde, UFC, or a combination thereof.

Illustrative aldehyde compounds can include the so-called masked aldehydes or aldehyde equivalents, such as acetals or hemiacetals. Suitable aldehydes can be represented by the general formula R'CHO, where R' is a hydrogen or a hydrocarbon radical generally having 1-8 carbon atoms. Specific examples of suitable aldehyde compounds can include, but are not limited to, formaldehyde, acetaldehyde, propionaldehyde, butyraldehyde, furfuraldehyde, benzaldehyde, or any combination or mixture thereof. As used herein, the term "formaldehyde" can refer to formaldehyde, formaldehyde derivatives, other aldehydes, or combinations thereof. Preferably, the aldehyde component is formaldehyde. One or more difunctional aldehydes can also be used to produce the novolac resin, and could advantageously be used to introduce cross-links ultimately into the at least partially cured binder composition.

The aldehyde can be used in many forms such as solid, liquid, and/or gas. Considering formaldehyde in particular, the formaldehyde can be or include paraform (solid, polymerized formaldehyde), formalin solutions (aqueous solutions of formaldehyde, sometimes with methanol, in 37 percent, 44 percent, or 50 percent formaldehyde concentrations), Urea-Formaldehyde Concentrate ("UFC"), and/or formaldehyde gas in lieu of or in addition to other forms of formaldehyde can also be used. In another example, the aldehyde can be or include a pre-reacted urea-formaldehyde mixture having a urea to formaldehyde weight ratio of about 1:2 to about 1:3.

Suitable urea-formaldehyde resins can be prepared from urea and formaldehyde monomers or from urea-formaldehyde precondensates in manners well known to those skilled in the art. Similarly, melamine-formaldehyde, phenol-formaldehyde, and resorcinol-formaldehyde polymers can be prepared from melamine, phenol, and resorcinol monomers, respectively, and formaldehyde monomers or from melamine-formaldehyde, phenol-formaldehyde, and resorcinol-formaldehyde precondensates. Urea, phenol, melamine, resorcinol, and formaldehyde reactants are commercially available in many forms and any form that can react with the other reactants and does not introduce extraneous moieties deleterious to the desired reaction and reaction product can be used in the preparation of the second copolymer. One suitable class of urea-formaldehyde polymers can be as discussed and described in U.S. Pat. No. 5,362,842.

The urea, if present in the second binder, can be provided in a variety of forms. For example, the urea can be solid urea, such as prill, and/or urea solutions, typically aqueous solutions, which are commonly available. Further, urea may be combined with another moiety, most typically formaldehyde and urea-formaldehyde adducts, often in aqueous solution. Any form of urea or urea in combination with formaldehyde can be used to make a urea-formaldehyde polymer. Both urea prill and combined urea-formaldehyde products are preferred, such as UFC. These types of products can be as discussed and described in U.S. Pat. Nos. 5,362,842 and 5,389,716, for example.

Many suitable urea-formaldehyde polymers are commercially available. Urea-formaldehyde polymers such as the types sold by Georgia-Pacific Chemicals LLC. (e.g., GP®-2928 and GP®-2980) for glass fiber mat applications, those sold by Hexion Specialty Chemicals, and by Arclin Company can be used. Suitable phenol-formaldehyde resins and melamine-formaldehyde resins can include those sold by Georgia Pacific Resins, Inc. (e.g., GP®-2894 and GP®-4878, respectively). These polymers are prepared in accordance with well known methods and contain reactive methylol groups which upon curing form methylene or ether linkages. Such methylol-containing adducts may include N,N'-dimethylol, dihydroxymethylolethylene; N,N'bis(methoxymethyl), N,N'-dimethylolpropylene; 5,5-dimethyl-N,N'dimethylolethylene; N,N'-dimethylolethylene; and the like.

Urea-formaldehyde resins can include from about 45% to about 70%, and preferably, from about 55% to about 65% solids, generally have a viscosity of about 50 cP to about 600 cP, preferably about 150 to about 400 cP, normally exhibit a pH of about 7 to about 9, preferably about 7.5 to about 8.5, and often have a free formaldehyde level of not more than about 3.0%, and a water dilutability of about 1:1 to about 100:1, preferably about 5:1 and above.

The phenol can include phenol and/or a variety of substituted phenolic compounds, unsubstituted phenolic compounds, or any combination of substituted and/or unsubstituted phenolic compounds. For example, the phenol component can be phenol itself (i.e., mono-hydroxy benzene). Examples of substituted phenols can include, but are not limited to, alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; and halogen-substituted phenols such as p-chlorophenol. Dihydric phenols such as catechol, resorcinol, hydroquinone, bis-phenol A and bis-phenol F also can also be used. Specific examples of suitable phenolic compounds (phenol components) for replacing a portion or all of the phenol used in preparing a novolac resin can include, but are not limited to, bis-phenol A, bis-phenol F, o-cresol, m-cresol, p-cresol, 3,5-5 xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5 dicyclohexyl phenol, p-phenyl phenol, p-phenol, 3,5-dimethoxy phenol, 3,4,5 trimethoxy phenol, p-ethoxy phenol, p-butoxy phenol, 3-methyl-4-methoxy phenol, p-phenoxy phenol, naphthol, anthranol and substituted derivatives thereof. Preferably, about 80 wt % or more, about 90 wt % or more, or about 95 wt % or more of the phenol component includes phenol (monohydroxybenzene). Suitable phenol-formaldehyde resins can include resole resins and/or novolac resins.

Melamine, if present in the second binder, can be provided in a variety of forms. For example, solid melamine, such as prill and/or melamine solutions can be used. Although melamine is specifically referred to, the melamine can be totally or partially replaced with other aminotriazine compounds. Other suitable aminotriazine compounds can include, but are not limited to, substituted melamines, cycloaliphatic guanamines, or combinations thereof. Substituted melamines include the alkyl melamines and aryl melamines that can be mono-, di-, or tri-substituted. In the alkyl substituted melamines, each alkyl group can contain 1-6 carbon atoms and, preferably 1-4 carbon atoms. Illustrative examples of the alkyl-substituted melamines can include, but are not limited to, monomethyl melamine, dimethyl melamine, trimethyl melamine, monoethyl melamine, and 1-methyl-3-propyl-5-butyl melamine. In the aryl-substituted melamines, each aryl group can contain 1-2 phenyl radicals and, preferably, one phenyl radical. Illustrative examples of aryl-substituted melamines can include, but are not limited to, monophenyl melamine and diphenyl melamine. Any of the cycloaliphatic guanamines can also be used. Suitable cycloaliphatic guanamines can include those having 15 or less carbon atoms. Illustrative cycloaliphatic guanamines can include, but are not limited to, tetrahydrobenzoguanamine, hexahydrobenzoguanamine, 3-methyl-tetrahydrobenzoguanamine, 3-methylhexahydrobenzoguanamine, 3,4-dimethyl-1,2,5,6-tetrahydrobenzoguanamine, and 3,4-dimethyl-hexahydrobenzoguanamine and mixtures thereof. Mixtures of aminotriazine compounds can include, for example, melamine and an alkyl-substituted melamine, such as dimethyl melamine, or melamine and a cycloaliphatic guanamine, such as tetrahydrobenzoguanamine.

The resorcinol component, if present in the second binder, can be provided in a variety of forms. For example, the resorcinol component can be provided as a white/off-white solid or flake and/or the resorcinol component can be heated and supplied as a liquid. Any form of the resorcinol can be used with any form of the aldehyde component to make the resorcinol-aldehyde copolymer. The resorcinol component can be resorcinol itself (i.e., Benzene-1,3-diol). Suitable resorcinol compounds can also be described as substituted phenols. The solids component of a liquid resorcinol-formaldehyde copolymer can range from about 45 wt % to about 75 wt %.

Liquid resorcinol-formaldehyde copolymers can have a Brookfield viscosity at 25° C. that varies widely, e.g., from about 200 cP to about 20,000 cP. Liquid resorcinol copolymers typically have a dark amber color.

The mixture of Maillard reactants can include, but is not limited to, a source of a carbohydrate (carbohydrate reactant) and an amine reactant capable of participating in a Maillard reaction with the carbohydrate reactant. In another example, the mixture of Maillard reactants can include a partially pre-reacted mixture of the carbohydrate reactant and the amine reactant. The extent of any pre-reaction can preserve the ability of the mixture of Maillard reactants to be blended with any other components desired to be added into composition such as one or more additives. Suitable Maillard reactants and Maillard reaction products can be as discussed and described in U.S. Patent Application Publication No. 2007/0027283; 2007/0123679; 2007/0123680; 2007/0142596; and 2011/0060095.

The aldehyde based resin(s) and/or the Maillard reactant based binder can be modified by combining with one or more modifiers. The modifier can be or include the copolymer of one or more vinyl aromatic derived units and at least one of maleic anhydride and maleic acid, optionally modified by reaction with one or more base compounds. In another example, the modifier can be or include an adduct of styrene, at least one of maleic anhydride and maleic acid, and at least one of an acrylic acid and an acrylate. In another example, the modifier can be or include the one or more latexes. In another example, the modifier can include two or more of: (1) a copolymer comprising one or more vinyl aromatic derived units and at least one of maleic anhydride and maleic acid; (2) an adduct of styrene, at least one of maleic anhydride and maleic acid, and at least one of an acrylic acid and an acrylate; and (3) one or more latexes. The addition of the one or more modifiers to the aldehyde based binder and/or the Maillard reactant based binder can be as discussed and described in U.S. Patent Application Publication No.: 2011/0060095.

The copolymer of one or more vinyl aromatic derived units and at least one of maleic anhydride and maleic acid can be produced using any suitable reactants. Similarly, the copolymer that includes one or more unsaturated carboxylic acids, one or more unsaturated carboxylic anhydrides, or a combination thereof, one or more vinyl aromatic derived units, and one or more base compounds can be produced using any suitable reactants. Similarly, the copolymer modified by reaction with one or more base compounds, where the copolymer includes one or more unsaturated carboxylic acids, one or more unsaturated carboxylic anhydrides, or a combination thereof, one or more vinyl aromatic derived units, can be produced using any suitable reactants. Illustrative vinyl aromatic derived units can include, but are not limited to, styrene, alpha-methylstyrene, vinyl toluene, and combinations thereof. Preferably, the vinyl aromatic derived units are derived from styrene and/or derivatives thereof. More preferably, the vinyl aromatic derived units are derived from styrene to produce a styrene maleic anhydride (acid) or "SMA" copolymer. Suitable SMA copolymers include resins that contain alternating styrenic and maleic anhydride (acid) monomer units, arranged in random, alternating, and/or block forms. The copolymer that includes one or more unsaturated carboxylic acids, one or more unsaturated carboxylic anhydrides, or a combination thereof, one or more vinyl aromatic derived units, and one or more amines can be as discussed and described in U.S. Patent Application Publication No.: 2011/0165398 and U.S. Patent Application having Ser. No. 13/228, 917.

Polyamide-epichlorhydrin polymers can be made by the reaction of epichlorohydrin and a polyamide under basic conditions (i.e. a pH between about 7 to about 11). The resulting polymer can then be contacted with an acid to stabilize the product. See, e.g., U.S. Pat. Nos. 3,311,594 and 3,442,754. Unreacted epichlorohydrin in the product can be hydrolyzed by the acid to 1,3-dichloro-2-propanol (1,3-DCP), 3-chloro-1,2-propanediol (CPD), and 2,3-dichloro-1-propanol (2,3-DCP). The 1,3-DCP product is the predominant hydrolysis product with CPD being formed in levels of about 10% of the 1,3-DCP and 2,3-DCP being formed in levels of about 1% of the 1,3-DCP. Although the final product can include several other types of organic chlorines (as measured by the difference between inorganic chloride and total chlorine concentrations), the 1,3-DCP and CPD concentrations can be accurately determined by $C^{13}$ NMR and GC-MS measuring techniques known in the art. The 2,3-DCP concentrations are, however, generally below the detection limit of $C^{13}$ NMR so 1,3-DCP and CPD are generally used as measurements for the epichlorohydrin hydrolysis products present in the polymer. Of particular utility are the polyamide-epchlorohydrin polymers, an example of which is sold under the trade names Kymene 557LX and Kymene 557H by Hercules, Inc. and AMRES® from Georgia-Pacific Resins, Inc. These polymers and the process for making the polymers are discussed and described in U.S. Pat. Nos. 3,700, 623 and 3,772,076. An extensive description of polymeric-epihalohydrin resins is given in Chapter 2: *Alkaline—Curing Polymeric Amine—Epichlorohydrin* by Espy in *Wet Strength Resins and Their Application* (L. Chan, Editor, 1994).

Illustrative polyamideoamine-epichlorhydrin polymer; a mixture and/or reaction product of a polyamidoamine and ammonia-epichlorohydrin adduct binder; and/or a mixture and/or reaction product of a polyamidoamine-epichlorhydrin polymer and at least one of a soy protein, a wheat protein, a pea protein, a corn protein, and a guar protein can include those discussed and described in U.S. Pat. Nos. 7,736,559 and 7,781,501; and U.S. Patent Application Publication Nos.: 2006/0142433; 2007/0054144; and 2008/0027159.

The adduct or polymer of styrene, at least one of maleic anhydride and maleic acid, and at least one of an acrylic acid and an acrylate can be produced using any suitable reactants. Any suitable acrylic acid or acrylate can be used such as methyl methacrylate, butyl acrylate, methacrylate, or any combination or mixture thereof. Preferably, the acrylate is methyl methacrylate (MMA). The adduct can be combined with the aldehyde based polymer, the Maillard reactants, or a combination thereof. In another example, the components of the adduct can be mixed with the aldehyde based polymer, the mixture of Maillard reactants, or a combination thereof.

The adduct can be prepared by dissolving the components of the adduct in a suitable solution. Illustrative solutions can include, but are not limited to, aqueous solutions of sodium hydroxide, ammonium hydroxide, potassium hydroxide, and combinations thereof. The solution can be heated to a temperature of about 70° C. to about 90° C. The solution can be held at the elevated temperature until the components are all at least partially in solution. The solution can then be added to the phenol-aldehyde resin, the mixture of Maillard reactants, or the combination of the phenol-aldehyde resin and the mixture of Maillard reactants.

The adduct can be prepared by combining styrene, at least one of maleic anhydride and maleic acid, and at least one of an acrylic acid and an acrylate to form a terpolymer. The amount of styrene in the adduct can range from a low of about 50 wt %, about 55 wt %, or about 60 wt % to a high of about 75 wt %, about 80 wt %, or about 85 wt %, based on the total weight of the adduct. The amount of the maleic anhydride and/or maleic acid in the adduct can range from a low of about 15 wt %, about 20 wt %, or about 25 wt % to a high of about 40 wt %, about 45 wt %, or about 50 wt %, based on the total weigh of the adduct. The amount of the acrylic acid and/or the acrylate in the adduct can range from a low of about 1 wt %, about 3 wt % or about 5 wt % to a high of about 10 wt %, about 15 wt %, or about 20 wt %, based on the total weight of the adduct.

In another example, the acrylic acid or acrylate can be combined with the copolymer of one or more vinyl aromatic derived units and at least one of maleic anhydride and maleic acid to provide the modifier. For example, combining the acrylic acid or acrylate with SMA can form a styrene maleic anhydride methyl-methacrylate terpolymer. In another example, the modifier can also include a physical mixture of styrene acrylic acid and/or styrene-acrylate copolymer and a SMA copolymer. The adduct or polymer of styrene, at least one of maleic anhydride and maleic acid, and at least one of an acrylic acid and an acrylate and the physical mixture of styrene acrylic acid and/or styrene-acrylate copolymer and a SMA copolymer can be prepared according to the processes discussed and described in U.S. Pat. No. 6,642,299.

The polyacrylic acid based binder can include an aqueous solution of a polycarboxy polymer, a monomeric trihydric alcohol, a catalyst, and a pH adjuster. The polycarboxy polymer can include an organic polymer or oligomer containing more than one pendant carboxy group. The polycarboxy polymer can be a homopolymer or copolymer prepared from unsaturated carboxylic acids including, but not limited to, acrylic acid, methacrylic acid, crotonic acid, isocrotonic acid, maleic acid, cinnamic acid, 2-methylmaleic acid, itaconic acid, 2-methylitaconic acid, α,β-methyleneglutaric acid, and the like. Other suitable polycarboxy polymers can be prepared from unsaturated anhydrides including, but not limited to, maleic anhydride, itaconic anhydride, acrylic anhydride, methacrylic anhydride, and the like, as well as mixtures thereof.

Illustrative trihydric alcohols can include, but are not limited to, glycerol, trimethylolpropane, trimethylolethane, triethanolamine, 1,2,4-butanetriol, and the like. The one or more trihydric alcohols can be mixed with other polyhydric alcohols. Other polyhydric alcohols can include, but are not limited to, ethylene, glycol, 1,3-propanediol, 1,4-butanediol, 1,6-hexanediol, 2-butene-1, erythritol, pentaerythritol, sorbitol, and the like. The catalyst can include an alkali metal salt of a phosphorous-containing organic acid; particularly alkali metal salts of phosphorous acid, hypophosphorous acid, and polyphosphoric acids. Illustrative catalysts can include, but are not limited to, sodium, sodium phosphite, potassium phosphite, disodium pyrophosphate, tetrasodium pyrophosphate, sodium tripolyphosphate, sodium hexametaphosphate, potassium phosphate, potassium polymetaphosphate, potassium polyphosphate, potassium tripolyphosphate, sodium trimetaphosphate, and sodium tetrametaphosphate, or any combination or mixture thereof. Illustrative polyacrylic acid based polymers can be as discussed and described in U.S. Pat. No. 7,026,390.

Suitable proteins can be or otherwise include, but are not limited to, corn flour, soy flour, wheat flour, spray dried blood, or any combination or mixture thereof. The soy flour can be a raw soy protein and/or a soy protein modified as discussed and described in U.S. Pat. No. 6,497,760. Raw soy protein can be in the form of ground whole beans (including the hulls, oil, protein, minerals, etc.), a meal (extracted or partially extracted), a flour (i.e., generally containing less than about 1.5% oil and about 30-35% carbohydrate), or an isolate (i.e., a substantially pure protein flour containing less than about 0.5% oil and less than about 5% carbohydrate). Suitable soy protein can be derived from any source of soy protein such as soybean concentrate or soybean meal. Protein-rich soybean-derived flours, such as soy protein isolate, protein concentrate and ordinary defatted soy flour, which contain in the range of about 20-95% protein, can be used. Of these, ordinary soy flour is the most abundant and cost-effective. The source of soy protein (soy flour) can be essentially free of functional urease. Information on soy protein can be found in, for example, Kirk-Othmer, Encyclopedia of Chemical Technology, Fourth Edition, Volume 22, pp. 591-619 (1997). Modified soy protein can be modified with either of two classes of modifiers. The first class of modifiers can include saturated and unsaturated alkali metal $C_8$-$C_{22}$ sulfate and sulfonate salts. Two preferred modifiers in this class are sodium dodecyl sulfate and sodium dodecylbenzene sulfonate. The second class of modifiers includes compounds having the formula $R_2NC(=X)NR_2$, where each R is individually selected from the group consisting of H and $C_1$-$C_4$ saturated and unsaturated groups, and X is selected from the group consisting of O, NH, and S. The $C_1$-$C_4$ saturated groups refer to alkyl groups (both straight and branched chain) and the unsaturated groups refer to alkenyl and alkynyl groups (both straight and branched chain). Illustrative modifiers in the second group can include, but are not limited to, urea and guanidine hydrochloride. Other suitable soy proteins and preparation thereof can include, but are not limited to, those discussed and described in U.S. Pat. Nos. 2,507,465; 2,492,510; 2,781,286; 3,285,805; 3,957,703; 4,070,314; 4,244,846; and 4,778,530.

Illustrative polysaccharide starches can include, but are not limited to, maize or corn, waxy maize, high amylose maize, potato, tapioca, wheat starch, or any combination or mixture thereof. Other starches such as genetically engineered starches can include, high amylose potato and potato amylopectin starches.

Lignin is a polymeric substance that can include substituted aromatics found in plant and vegetable matter associated with cellulose and other plant constituents. Illustrative plant and vegetable matter can include, but is not limited to, straw, hemp, sisal, cotton stalk, wheat, bamboo, sabai grass, rice straw, banana leaves, paper mulberry (i.e., bast fiber), abaca leaves, pineapple leaves, esparto grass leaves, fibers from the genus *Hesperaloe* in the family Agavaceae jute, salt water reeds, palm fronds, flax, ground nut shells, hardwoods, softwoods, recycled fiberboards such as high density fiberboard, medium density fiberboard, low density fiberboard, oriented strand board, particleboard, or any combination or mixture thereof. For example, the plant matter can be or include wood, for example hardwoods, softwoods, or a combination thereof. Illustrative types of wood can include, but are not limited to, alder, ash, aspen, basswood, beech, birch, cedar, cherry, cottonwood, cypress, elm, fir, gum, hackberry, hickory, maple, oak, pecan, pine, poplar, redwood, sassafras, spruce, sycamore, walnut, and willow.

The lignin can be extracted or otherwise recovered from the plant and/or vegetable matter using any suitable process or combination of processes. For example, in the pulp and paper industry, lignin-containing materials such as wood, straw, corn stalks, bagasse, and other vegetable and plant tissues are processed to recover the cellulose or pulp. As such, the residual pulping liquors that include the lignin as a by-product can be a source of lignin. There can be variation in the chemical structure of lignin. The variation in the chemical structure of lignin can depend, at least in part, on the particular plant from which the lignin is recovered from, location the plant was grown, and/or on the particular method used in recovery or isolation of the lignin from the plant and/or vegetable matter. Lignin can include active groups, such as active hydrogens and/or phenolic hydroxyl groups through which crosslinking or bridging can be effected.

Since the lignin separated from the plant may be chemically altered somewhat from that found in the plant, the term "lignin," can also refer to lignin products obtained upon separation from the cellulose or recovered from the plant matter. For example, in a sulfite pulping process, the lignocellulose material can be digested with a bisulfite or sulfite resulting in the at least partial sulfonation of the lignin. As such, the lignin can optionally be subjected to further cleavage or modifications such as alkaline treatment or reaction with other constituents to decrease the sulfonate sulfur content or increase the active groups. For example, the lignin can be processed such that it has a phenolic hydroxyl content ranging from about 1.5 wt % to about 5 wt % and less than about 3 wt % sulfonate sulfur. In other methods of recovery or separation of lignin from plant tissue, the lignin may not be sulfonated, but could be chemically altered somewhat in some other manner. For example, in residual pulping liquors obtained in sulfate or other alkaline pulping processes, the lignin can be present as an alkali metal salt dissolved in the alkaline aqueous liquor and can generally include a sufficient phenolic hydroxyl content to require no further modification. However, the alkali or kraft lignin can be further reacted with other constituents to further increase the active groups. "Hydrolysis lignin" that can be recovered from the hydrolysis of lignocellulose materials in the manufacture of sugar can also be altered somewhat from that found in the plant. As such hydrolysis lignin can be further modified to solubilize the lignin as well as to increase the phenolic hydroxyl content. Also, the lignin products such as a residual pulping liquor may be subjected to various treatments such as, for example, acid, alkaline or heat treatments or reacted with the other chemicals which may further alter somewhat the lignin constituents. Illustrative sulfonated lignins can include, but are not limited to, sodium lignosulfonate and ammonium lignodulfonate.

The residual pulping liquors, or the lignin products produced in the separation or recovery of lignin from the plant matter can include lignin of various molecular weights ranging form about 300 to over 100,000. The liquors from which the lignin can be recovered can also include one or more other constituents besides the lignin. For example, in the sulfite pulping process, the spent sulfite liquor can include lignosulfonates that can be present as salts of cations, such as magnesium, calcium, ammonium, sodium and/or other cations. The spent sulfite liquor solids can include about 40 wt % to about 65 wt % lignosulfonates with the remainder being carbohydrates and other organic and inorganic constituents dissolved in the liquor. Lignin products produced by other pulping processes can also include other materials such as carbohydrates, degradation products of carbohydrates, and resinous materials which are separated from the cellulosic materials with the lignin. It should be noted that it is not necessary to separate the lignin from the other constituents that can be present.

The binder compositions can be combined with one or more second binders or adhesives in any desired amount with respect to one another to produce a binder system. For example, the amount of either the first binder composition or the second binder composition in the binder system can range from about 0.1 wt % to about 99 wt %, based on the combined solids weight of the first and second binder compositions. In another example, the binder system can have a concentration of the first binder composition in an amount ranging from a low of about 0.5 wt %, about 1 wt %, about 2 wt %, about 3 wt %, or about 4 wt % to a high of about 10 wt %, about 20 wt %, about 30 wt %, about 40 wt %, about 50 wt %, about 60 wt %, about 70 wt %, about 80 wt %, or about 90 wt %, based on the combined solids weight of the first and second binder compositions. In another example, the binder system can have a concentration of the first binder composition in an amount of about 10 wt % to about 90 wt % and a concentration of the second binder system of about 90 wt % to about 10 wt %, based on the combined solids weight of the first binder composition and the second binder composition.

The binder compositions can be free or essentially free of formaldehyde. As used herein, the term "essentially free of formaldehyde" means the binder composition does not include or contain any intentionally added formaldehyde or compounds that can decompose, react, or otherwise form formaldehyde. Said another way, the term "essentially free of formaldehyde" means the binder composition does not contain formaldehyde or compounds that can form formaldehyde, but may include formaldehyde present as an impurity. Accordingly, depending on the particular multifunctional aldehyde compound(s) used to produce the binder compositions, the binder composition can be referred to as "no added formaldehyde" or "NAF" binder composition.

The binder composition can meet or exceed the formaldehyde emission standards required by the California Air Resources Board ("CARB") Phase 1 (less than 0.1 parts per million "ppm" formaldehyde for particleboard), and Phase 2 (less than 0.09 ppm formaldehyde for particleboard). The binder compositions can also meet or exceed the formaldehyde emission standards required by the Japanese JIS/JAS F* (does not exceed 0.5 mg/L formaldehyde for particleboard), Japanese JIS/JAS F** (does not exceed 0.3 mg/L formaldehyde for particleboard), European E1, and European E2 standards.

As such, the composite wood products and/or the composite fiber products produced with the binder compositions and/or binder systems can exhibit a low level of formaldehyde emission. A suitable test for determining formaldehyde emission from a composite wood product that includes an at least partially cured binder composition and/or binder system can include ASTM D6007-02 and AST E1333-10. A suitable test procedure for determining formaldehyde emissions from fiber products that include an at least partially cured binder composition and/or binder system can include ASTM D5116-10 and ASTM D6670-01. For example, the composite wood products and/or the fiber products containing an at least partially cured binder composition and/or binder system can exhibit a formaldehyde emission of zero. In another example, the composite wood products and/or the fiber products containing an at least partially cured binder composition and/or binder system can exhibit a formaldehyde emission of less than about 1 part per million ("ppm"), less than about 0.9 ppm, less than about 0.08 ppm, less than about 0.07 ppm, less than about 0.06 ppm, less than about 0.05 ppm, less than about 0.04 ppm, less than about 0.03 ppm, less than about 0.02 ppm, less than about 0.01 ppm, or less than about 0.005 ppm.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Example I

Black wattle tannin, glyoxal, and sodium silicate were combined with one another to produce the binder compositions. The black wattle tannin was purchased from Bondtite Adhesives Ltd. and was product number 345. The glyoxal was a 40 wt % aqueous solution (Product Number 128465) and was purchased from Sigma Aldrich. The sodium silicate was a 10 wt % aqueous solution (Product Number 338443) and was purchased from Sigma-Aldrich.

A series of binder compositions (Ex. 1-16) were prepared according to the following procedure. The pH of 13.5 g black wattle tannin (50 wt % aqueous solution) was adjusted to the desired pH value, which ranged from 7.9 to 12.3, depending on the particular example, by adding a sufficient amount of a 50 wt % aqueous sodium hydroxide solution. An Orion 2 Star pH meter was used to monitor the pH of the black wattle tannin. To the black wattle tannin was added 1.5 g glyoxal (40 wt % aqueous solution) and 1.5 g sodium silicate (10 wt % solution) to provide the binder compositions. As such, the binder compositions for Examples 1-16 all had a black wattle concentration of about 90 wt %, a glyoxal concentration of about 8 wt %, and a sodium silicate concentration of about 2 wt %, based on the combined weight of the black wattle tannin, the glyoxal, and the sodium silicate. The binder compositions were prepared at a temperature of about 25° C.

The gel tests were conducted according to the following procedure. About 10 g of each binder composition (Ex. 1-16) was added to an 18×150 mm pyrex test tube. A wooden applicator stick (Fisher, 01-340) was inserted into the test tube. The gel meter used to determine the gel time was Techne Incorporated's GT-4 gel meter. The "hold-operate" switch was placed in the "operate" position and the plunger on the gel meter was tapped to trigger the red light, so that the meter was in the stopped position. The "hold-operate" switch was then placed in the "hold" position and the "zero" button was pressed to clear the time display. The test tube was then placed into a boiling bath of water at 100° C., using the stopper for alignment and the "start" button was pressed. The wooden stick was connected to the plunger by inserting the top of the stick into the connector. The height of the sample was adjusted, by either adjusting the jack stand or moving the height of the meter, so that the stick was 0.25 inches from the bottom of the test tube at its lowest point, and in the middle of the test tube, not touching the sides. The "hold-operate" switch was positioned to "operate" to activate the gel-point sensor. The timer and motor automatically stopped when the gel point was reached and the time was recorded. The results are shown in Table 1.

TABLE 1

Effect of pH on Gel Time

| Example | pH of Black Wattle Tannin | gel time (min) |
|---|---|---|
| 1 | 7.9 | not gelled in 30 min |
| 2 | 7.9 | not gelled in 30 min |
| 3 | 9 | 3.6 |
| 4 | 9 | 3 |
| 5 | 9 | 4.1 |
| 6 | 9.5 | 1.5 |
| 7 | 9.5 | 1.4 |
| 8 | 10 | 0.9 |
| 9 | 10 | 1.3 |
| 10 | 10 | 1.1 |
| 11 | 10 | 0.8 |
| 12 | 11.1 | 1.2 |
| 13 | 11.1 | 1.1 |
| 14 | 11.1 | 0.9 |
| 15 | 12.3 | not gelled in 30 min |
| 16 | 12.3 | not gelled in 30 min |

As shown in Table 1, Examples 3-14 all gelled within in less than 5 minutes. The pH range for which the binder compositions gelled started somewhere between a pH of about 8 to about 9, with the binder composition gelling up to a pH of between about 11.1 and about 12.2.

Example II

The effect of varying the amount of sodium silicate was determined. More particularly, a series of examples (Ex. 17-27) were prepared having the same amount of black wattle tannin and glyoxal, but varying the amount of the sodium silicate. The binder compositions were prepared in the same manner as Examples 1-16. The test results are shown below in Table 2.

TABLE 2

Effect of Lewis Acid on Gel Time Test

| Example | pH of Black Wattle Tannin | Sodium Silicate (10 wt %, g) | Sodium Silicate (wt % solid basis) | gel time (min) |
|---|---|---|---|---|
| 17 | 10.07 | 0.3 | 0.41 | >30 |
| 18 | 10.07 | 0.39 | 0.53 | 9.6 |
| 19 | 10.07 | 0.45 | 0.61 | 6.2 |
| 20 | 10.07 | 0.5 | 0.68 | 2.5 |
| 21 | 10.07 | 0.5 | 0.68 | 2.5 |
| 22 | 10.07 | 0.6 | 0.82 | 1.4 |
| 23 | 10.07 | 0.6 | 0.82 | 1.5 |
| 24 | 10.07 | 0.75 | 1.02 | 0.6 |
| 25 | 10.03 | 0.75 | 1.02 | 0.5 |
| 26 | 10.03 | 1.5 | 2.04 | 0.3 |
| 27 | 10.03 | 1.5 | 2.04 | 0.3 |

As shown in Table 2, when the amount of sodium silicate fell below an amount somewhere between about 0.41 wt % and about 0.53 wt % on a solids basis, the binder composition did not gel within 30 minutes. When the sodium silicate was present in the binder composition in an amount of about 0.5 wt % or more on a solids basis the binder compositions gelled in less than 10 minutes. Also as shown in Table 2, as the amount of sodium silicate increased from about 0.53 wt % to about 2.04 wt % on a solids basis the gel time continued to decrease. As such, the sodium silicate was observed to promote or accelerate the crosslinking reactions between the black wattle tannin and the glyoxal.

Example III

The effect of varying the ratio of black wattle tannin to glyoxal was studied. More particularly, a series of examples (Ex. 28-39) were prepared having varying amounts of black wattle tannin (all at a pH of about 10.01) and glyoxal and keeping the amount of sodium silicate constant, i.e., about 0.6 g (10 wt % solution). The binder compositions were prepared according to the same procedure used in Example I above. The results of the test are shown below in Table 3.

TABLE 3

Effect of Tannin:Glyoxal Ratio on the Gel Time

| Example | Black wattle tannin (g, 50 wt % conc., pH 10.01) | glyoxal (g, 40 wt % conc.) | sodium silicate (g, 10 wt % conc.) | gel time (min) |
|---|---|---|---|---|
| 28 | 12 | 3 | 0.6 | 1.6 |
| 29 | 12 | 3 | 0.6 | 1.8 |
| 30 | 12.75 | 2.25 | 0.6 | 2 |
| 31 | 12.75 | 2.25 | 0.6 | 2.2 |
| 32 | 13.5 | 1.5 | 0.6 | 2.5 |
| 33 | 13.5 | 1.5 | 0.6 | 2.5 |
| 34 | 13.8 | 1.2 | 0.6 | 3.7 |
| 35 | 13.8 | 1.2 | 0.6 | 1.5 |
| 36 | 13.8 | 1.2 | 0.6 | 1.6 |
| 37 | 13.8 | 1.2 | 0.6 | 7.2 |
| 38 | 14.25 | 0.75 | 0.6 | 11.9 |
| 39 | 14.25 | 0.75 | 0.6 | 14.7 |

As shown in Table 3, when the amount of sodium silicate was held constant, i.e., at about 0.6 of a 10 wt % solution, the gel time remained between about 1.5 and about 4 minutes when the amount of tannins ranged from about 80 wt % (Ex. 28 and 29) up to about 92 wt % (Ex. 34-37), based on the combined weight of tannins and glyoxal. When the amount of tannins was at about 95 wt % (Ex. 38 and 39) based on the combined weight of the tannins and the glyoxal the gel time substantially increased to more than 11 minutes.

Embodiments of the present disclosure further relate to any one or more of the following paragraphs:

1. A method for making a composite product, comprising: contacting a plurality of substrates with a binder composition, wherein the binder composition comprises: one or more tannins; one or more Lewis acids; and one or more multifunctional aldehyde compounds, wherein the one or more multifunctional aldehyde compounds comprises: (1) two or more carbon atoms and two or more aldehyde functional groups, or (2) two or more carbon atoms, at least one aldehyde functional group, and at least one functional group other than an aldehyde functional group; and at least partially curing the binder composition to provide a composite product, wherein a carbon atom of at least one aldehyde functional group in the cured binder composition has a first bond with a first tannin molecule of the one or more tannins and a second bond with (a) the first tannin molecule, (b) a second tannin molecule of the one or more tannins, or (c) an oxygen atom of the at least one aldehyde functional group.

2. A composite product, comprising: a plurality of substrates and an at least partially cured binder composition, wherein the binder composition, prior to curing, comprises: one or more tannins; one or more Lewis acids; and one or more multifunctional aldehyde compounds, wherein the one or more multifunctional aldehyde compounds comprises: (1) two or more carbon atoms and two or more aldehyde functional groups, or (2) two or more carbon atoms, at least one aldehyde functional group, and at least one functional group other than an aldehyde functional group, wherein a carbon atom of at least one aldehyde functional group in the cured binder composition has a first bond with a first tannin molecule of the one or more tannins and a second bond with (a) the first tannin molecule, (b) a second tannin molecule of the one or more tannins, or (c) an oxygen atom of the at least one aldehyde functional group.

3. The method or composite product according to paragraph 1 or 2, wherein the at least one functional group other than an aldehyde functional group is present and selected from the group consisting of: a carboxylic acid group, an ester group, an amide group, an imine group, an epoxide group, an aziridine group, an azetidinium group, or a hydroxyl group.

4. The method or composite product according to any one of paragraphs 1 to 3, wherein the one or more tannins is present in an amount ranging from about 60 wt % to about 99 wt %, based on a combined solids weight of the one or more tannins and the one or more multifunctional aldehyde compounds.

5. The method or composite product according to any one of paragraphs 1 to 4, wherein the one or more tannins, the one or more multifunctional aldehyde compounds, and the one or more Lewis acids are combined with one another in a liquid medium.

6. The method or composite product according paragraph 5, wherein the liquid medium comprises water, and wherein the binder composition has a concentration of water ranging from about 1 wt % to about 70 wt %, based on a combined weight of the one or more tannins, the one or more multifunctional aldehyde compounds, the one or more Lewis acids, and water.

7. The method or composite product according paragraph 5, wherein the binder composition has a concentration of water ranging from about 40 wt % to about 70 wt %, based on a combined weight of the tannin, the multifunctional aldehyde compound, the Lewis acid, and water.

8. The method or composite product according to any one of paragraphs 1 to 7, wherein the binder composition is essentially free of formaldehyde.

9. The method or composite product according to any one of paragraphs 1 to 8, wherein the one or more tannins is extracted from one or more trees belonging to the genera selected from the group consisting of: *Acacia, Castanea, Vachellia, Senegalia, Terminalia, Phyllanthus, Caesalpinia, Quercus, Schinopsis, Tsuga, Rhus, Juglans, Carya*, and *Pinus*.

10. The method or composite product according to any one of paragraphs 1 to 9, wherein the one or more tannins is extracted from one or more trees belonging to the genera selected from the group consisting of: *Schinopsis, Acacia*, or a combination thereof.

11. The method or composite product according to any one of paragraphs 1 to 10, wherein the one or more multifunctional aldehyde compounds comprises glyoxal, glutaraldehyde, glyoxylic acid, malondialdehyde, adipaldehyde, phthalaldehyde, 5-(hydroxymethyl)furfural, or any combination thereof.

12. The method or composite product according to any one of paragraphs 1 to 11, wherein at least one of the one or more tannins, the one or more multifunctional aldehyde compounds, and the one or more Lewis acid compounds is encapsulated in a plurality of capsules.

13. The method or composite product according to paragraph 12, further comprising fracturing at least a portion of the capsules to cause direct contact between the one or more tannins, the one or more multifunctional aldehyde compound, and the one or more Lewis acids.

14. The method or composite product according to paragraph 12 or 13, wherein the capsules have an average cross-sectional size ranging from about 1 μm to about 1,000 μm.

15. The method or composite product according to any one of paragraphs 1 to 14, wherein the one or more multifunctional aldehyde compounds is blocked with a blocking agent.

16. The method or composite product according to paragraph 15, wherein the blocking agent comprises ureas, cyclic ureas, glycols, polyols, or any combination thereof.

17. The method or composite product according to any one of paragraphs 1 to 16, wherein the binder composition further comprises one or more base compounds.

18. The method or composite product according to paragraph 15, wherein the one or more base compound comprises potassium hydroxide, sodium hydroxide, potassium carbonate, sodium carbonate, or any combination thereof.

19. The method or composite product according to 18, wherein the one or more base compounds is present in an amount sufficient to provide a binder composition having a pH ranging from about 4 to about 14.

20. The method or composite product according to any one of paragraphs 1 to 19, wherein the one or more Lewis acids comprises boric acid, sodium tetraborate, aluminum hydroxide, silicon dioxide, sodium silicate, or any combination thereof.

21. The method or composite product according to any one of paragraphs 1 to 20, wherein the one or more tannins comprises a tannin derived from a black wattle tree, a quebracho tree, or a combination thereof, wherein the one or more multifunctional aldehyde compounds comprises glyoxal, glutaraldehyde, or a combination thereof, and wherein the one or more Lewis acids comprises sodium silicate, boric acid, or a combination thereof.

22. The method or composite product according to any one of paragraphs 1 to 21, further comprising combining a second binder composition with the binder composition to provide a binder system, wherein the plurality of substrates is contacted with the binder system.

23. The method or composite product according to paragraph 22, wherein the second binder composition comprises an aldehyde based resin; a reaction product of Maillard reactants; a copolymer of one or more vinyl aromatic derived units and at least one of maleic anhydride and maleic acid; a polyamidoamine-epichlorhydrin polymer; a mixture of a polyamidoamine and ammonia-epichlorhydrin adduct binder; a mixture of a polyamidoamine-epichlorhydrin polymer and at least one of a soy protein, a wheat protein, a pea protein, a corn protein, and a guar protein; an adduct or polymer of styrene, at least one of maleic anhydride and maleic acid, and at least one of an acrylic acid and an acrylate; a polyacrylic acid based binder; polyvinyl acetate; polymeric methylene diisocyanate; starch; soy protein, lignin; or any combination thereof.

24. The method or composite product according to paragraph 22, wherein the second binder composition is present, and wherein the second binder composition is selected from the group consisting of: urea-aldehyde, melamine-aldehyde, phenol-aldehyde, melamine-urea-aldehyde, phenol-urea-aldehyde, phenol-melamine-aldehyde, and any combination thereof.

25. The method or composite product according to any one of paragraphs 22 to 24, wherein the second binder composition is present in an amount of about 10 wt % to about 90 wt %, based on a combined weight of the first and second binder compositions.

26. The method or composite product according to any one of paragraphs 1 to 25, wherein the composite product comprises a particleboard, a fiberboard, a plywood, an oriented strand board, a laminated veneer lumber, or a laminated veneer board, or a non-woven fiberglass mat.

27. The method or composite product according to any one of paragraphs 1 to 26, wherein the one or more tannins is present in an amount of ranging from about 80 wt % to about 95 wt %, based on a combined solids weight of the tannin and the multifunctional aldehyde compound.

28. The method or composite product according to any one of paragraphs 1 to 27, wherein the tannin is present in an amount ranging from about 85 wt % to about 91 wt %, based on a combined solids weight of the tannin and the multifunctional aldehyde compound.

29. The method or composite product according to any one of paragraphs 1 to 28, wherein the tannin, the multifunctional aldehyde compound, and the Lewis acid are combined with one another in water.

30. A method for making a composite product, comprising: contacting a plurality of lignocellulose substrates with a binder composition, wherein the binder composition comprises: one or more tannins derived from a black wattle tree, a quebracho tree, or a combination thereof one or more Lewis acids comprising boric acid, sodium tetraborate, aluminum hydroxide, silicon dioxide, sodium silicate, or any combination thereof one or more base compound comprising potassium hydroxide, sodium hydroxide, potassium carbonate, sodium carbonate, or any combination thereof; and one or more multifunctional aldehyde compounds, wherein the one or more multifunctional aldehyde compounds comprises: (1) two or more carbon atoms and two or more aldehyde functional groups, or (2) two or more carbon atoms, at least one aldehyde functional group, and at least one functional group other than an aldehyde functional group; and at least partially curing the binder composition to provide a composite product, wherein a carbon atom of at least one aldehyde functional group in the cured binder composition has a first bond with a first tannin molecule of the one or more tannins and a second bond with (a) the first tannin molecule, (b) a second tannin molecule of the one or more tannins, or (c) an oxygen atom of the at least one aldehyde functional group.

31. The method according to paragraph 30, wherein the one or more multifunctional aldehyde compounds comprises glyoxal, glutaraldehyde, glyoxylic acid, malondialdehyde, adipaldehyde, phthalaldehyde, 5-(hydroxymethyl)furfural, or any combination thereof.

32. The method according to paragraph 30 or 31, wherein the at least one functional group other than an aldehyde functional group is present and selected from the group consisting of: a carboxylic acid group, an ester group, an amide group, an imine group, an epoxide group, an aziridine group, an azetidinium group, or a hydroxyl group.

33. The method according to any one of paragraphs 30 to 32, wherein at least one of the one or more tannins, the one or more multifunctional aldehyde compounds, and the one or more Lewis acid compounds is encapsulated in a plurality of capsules.

34. The method according to any one of paragraphs 30 to 33, wherein the one or more multifunctional aldehyde compounds is blocked with a blocking agent.

35. The method according to paragraph 34, wherein the blocking agent comprises ureas, cyclic ureas, glycols, polyols, or any combination thereof.

36. The method according to any one of paragraphs 30 to 35, further comprising combining a second binder composition with the binder composition to provide a binder system, wherein the plurality of substrates is contacted with the binder system.

37. The method according to paragraph 36, wherein the second binder composition comprises an aldehyde based resin; a reaction product of Maillard reactants; a copolymer of one or more vinyl aromatic derived units and at least one of maleic anhydride and maleic acid; a polyamidoamine-epichlorhydrin polymer; a mixture of a polyamidoamine and ammonia-epichlorhydrin adduct binder; a mixture of a polyamidoamine-epichlorhydrin polymer and at least one of a soy protein, a wheat protein, a pea protein, a corn protein, and a guar protein; an adduct or polymer of styrene, at least one of maleic anhydride and maleic acid, and at least one of an acrylic acid and an acrylate; a polyacrylic acid based binder; polyvinyl acetate; polymeric methylene diisocyanate; starch; soy protein, lignin; or any combination thereof.

38. The method according to paragraph 37, wherein the second binder composition is present, and wherein the second binder composition is selected from the group consisting of: urea-aldehyde, melamine-aldehyde, phenol-aldehyde, melamine-urea-aldehyde, phenol-urea-aldehyde, phenol-melamine-aldehyde, and any combination thereof.

39. The method according to any one of paragraphs 30 to 38, wherein the composite product comprises a particleboard, a fiberboard, a plywood, an oriented strand board, a laminated veneer lumber, or a laminated veneer board, or a non-woven fiberglass mat.

40. The method according to any one of paragraphs 30 to 39, wherein the one or more tannins is present in an amount of ranging from about 80 wt % to about 95 wt %, based on a combined solids weight of the tannin and the multifunctional aldehyde compound.

41. The method according to any one of paragraphs 30 to 40, wherein the tannin is present in an amount ranging from about 85 wt % to about 91 wt %, based on a combined solids weight of the tannin and the multifunctional aldehyde compound.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for making a composite product, comprising:
   contacting a plurality of substrates with a binder composition, wherein the binder composition comprises:
   one or more tannins;
   one or more Lewis acids; and
   one or more multifunctional aldehyde compounds, wherein the one or more multifunctional aldehyde compounds comprises:
   (1) two or more carbon atoms and two or more aldehyde functional groups, or
   (2) two or more carbon atoms, at least one aldehyde functional group, and at least one functional group other than an aldehyde functional group; and
   at least partially curing the binder composition to provide a composite product, wherein a carbon atom of at least one aldehyde functional group in the cured binder composition has a first bond with a first tannin molecule of the one or more tannins and a second bond with (a) the first tannin molecule, (b) a second tannin molecule of the one or more tannins, or (c) an oxygen atom of the at least one aldehyde functional group.

2. The method of claim 1, wherein the at least one functional group other than an aldehyde functional group is present and selected from the group consisting of: a carboxylic acid group, an ester group, an amide group, an imine group, an epoxide group, an aziridine group, an azetidinium group, or a hydroxyl group.

3. The method of claim 1, wherein the one or more tannins is present in an amount ranging from about 60 wt % to about 99 wt %, based on a combined solids weight of the one or more tannins and the one or more multifunctional aldehyde compounds.

4. The method of claim 1, wherein the one or more tannins, the one or more multifunctional aldehyde compounds, and the one or more Lewis acids are combined with one another in a liquid medium.

5. The method of claim 4, wherein the liquid medium comprises water, and wherein the binder composition has a concentration of water ranging from about 1 wt % to about 70 wt %, based on a combined weight of the one or more tannins, the one or more multifunctional aldehyde compounds, the one or more Lewis acids, and water.

6. The method of claim 1, wherein the one or more tannins is extracted from one or more trees belonging to the genera selected from the group consisting of: *Acacia, Castanea, Vachellia, Senegalia, Terminalia, Phyllanthus, Caesalpinia, Quercus, Schinopsis, Tsuga, Rhus, Juglans, Carya*, and *Pinus*.

7. The method of claim 1, wherein the one or more multifunctional aldehyde compounds comprises glyoxal, glutaraldehyde, glyoxylic acid, malondialdehyde, adipaldehyde, phthalaldehyde, 5-(hydroxymethyl)furfural, or any combination thereof.

8. The method of claim 1, wherein at least one of the one or more tannins, the one or more multifunctional aldehyde compounds, and the one or more Lewis acid compounds is encapsulated in a plurality of capsules.

9. The method of claim 8, further comprising fracturing at least a portion of the capsules to cause direct contact between the one or more tannins, the one or more multifunctional aldehyde compound, and the one or more Lewis acids.

10. The method of claim 1, wherein the one or more multifunctional aldehyde compounds is blocked with a blocking agent.

11. The method of claim 10, wherein the blocking agent comprises ureas, cyclic ureas, glycols, polyols, or any combination thereof.

12. The method of claim 1, wherein the binder composition further comprises one or more base compounds, and wherein the one or more base compound comprises potassium hydroxide, sodium hydroxide, potassium carbonate, sodium carbonate, or any combination thereof.

13. The method of claim 1, wherein the one or more Lewis acids comprises boric acid, sodium tetraborate, aluminum hydroxide, silicon dioxide, sodium silicate, or any combination thereof.

14. The method of claim 1, wherein the one or more tannins comprises a tannin derived from a black wattle tree, a quebracho tree, or a combination thereof, wherein the one or more multifunctional aldehyde compounds comprises glyoxal, glutaraldehyde, or a combination thereof, and wherein the one or more Lewis acids comprises sodium silicate, boric acid, or a combination thereof.

15. The method of claim 1, further comprising combining a second binder composition with the binder composition to provide a binder system, wherein the plurality of substrates is contacted with the binder system.

16. The method of claim 15, wherein the second binder composition comprises an aldehyde based resin; a reaction product of Maillard reactants; a copolymer of one or more vinyl aromatic derived units and at least one of maleic anhydride and maleic acid; a polyamidoamine-epichlorhydrin polymer; a mixture of a polyamidoamine and ammonia-epichlorhydrin adduct binder; a mixture of a polyamidoamine-epichlorhydrin polymer and at least one of a soy protein, a wheat protein, a pea protein, a corn protein, and a guar protein; an adduct or polymer of styrene, at least one of maleic anhydride and maleic acid, and at least one of an acrylic acid and an acrylate; a polyacrylic acid based binder; polyvinyl acetate; polymeric methylene diisocyanate; starch; soy protein, lignin; or any combination thereof.

17. The method of claim 1, wherein the composite product comprises a particleboard, a fiberboard, a plywood, an oriented strand board, a laminated veneer lumber, or a laminated veneer board, or a non-woven fiberglass mat.

18. A method for making a composite product, comprising:
contacting a plurality of lignocellulose substrates with a binder composition, wherein the binder composition comprises:
one or more tannins derived from a black wattle tree, a quebracho tree, or a combination thereof;
one or more Lewis acids comprising boric acid, sodium tetraborate, aluminum hydroxide, silicon dioxide, sodium silicate, or any combination thereof;
one or more base compound comprising potassium hydroxide, sodium hydroxide, potassium carbonate, sodium carbonate, or any combination thereof; and
one or more multifunctional aldehyde compounds, wherein the one or more multifunctional aldehyde compounds comprises:
(1) two or more carbon atoms and two or more aldehyde functional groups, or
(2) two or more carbon atoms, at least one aldehyde functional group, and at least one functional group other than an aldehyde functional group; and
at least partially curing the binder composition to provide a composite product, wherein a carbon atom of at least one aldehyde functional group in the cured binder composition has a first bond with a first tannin molecule of the one or more tannins and a second bond with (a) the first tannin molecule, (b) a second tannin molecule of the one or more tannins, or (c) an oxygen atom of the at least one aldehyde functional group.

19. The method of claim 18, wherein the one or more multifunctional aldehyde compounds comprises glyoxal, glutaraldehyde, glyoxylic acid, malondialdehyde, adipaldehyde, phthalaldehyde, 5-(hydroxymethyl)furfural, or any combination thereof.

20. A composite product, comprising:
a plurality of substrates and an at least partially cured binder composition, wherein the binder composition, prior to curing, comprises:
one or more tannins;
one or more Lewis acids; and
one or more multifunctional aldehyde compounds, wherein the one or more multifunctional aldehyde compounds comprises:
(1) two or more carbon atoms and two or more aldehyde functional groups, or
(2) two or more carbon atoms, at least one aldehyde functional group, and at least one functional group other than an aldehyde functional group, wherein a carbon atom of at least one aldehyde functional group in the cured binder composition has a first bond with a first tannin molecule of the one or more tannins and a second bond with (a) the first tannin molecule, (b) a second tannin molecule of the one or more tannins, or (c) an oxygen atom of the at least one aldehyde functional group.

* * * * *